(12) United States Patent
Hunt et al.

(10) Patent No.: US 7,774,796 B2
(45) Date of Patent: *Aug. 10, 2010

(54) METHODS OF FACTORING OPERATING SYSTEM FUNCTIONS, METHODS OF CONVERTING OPERATING SYSTEMS, AND RELATED APPARATUS

(75) Inventors: Galen C. Hunt, Bellevue, WA (US);
Gerald Cermak, Bothell, WA (US);
Robert J. Stets, Jr., Rochester, NY (US)

(73) Assignee: Microsoft Corporation, Redmond, WA (US)

( * ) Notice: Subject to any disclaimer, the term of this patent is extended or adjusted under 35 U.S.C. 154(b) by 1648 days.

This patent is subject to a terminal disclaimer.

(21) Appl. No.: 10/994,737

(22) Filed: Nov. 22, 2004

(65) Prior Publication Data

US 2005/0102678 A1 May 12, 2005

Related U.S. Application Data

(63) Continuation of application No. 10/951,306, filed on Sep. 27, 2004, which is a continuation of application No. 09/334,104, filed on Jun. 16, 1999, now Pat. No. 6,826,760.

(51) Int. Cl.
*G06F 9/44* (2006.01)
*G06F 9/46* (2006.01)

(52) U.S. Cl. ..................... 719/328; 718/104
(58) Field of Classification Search ............... 719/316, 719/328, 330; 718/104
See application file for complete search history.

(56) References Cited

U.S. PATENT DOCUMENTS

| 4,768,150 | A | 8/1988 | Chang et al. |
|---|---|---|---|
| 5,097,533 | A | 3/1992 | Burger et al. |
| 5,379,432 | A | 1/1995 | Orton et al. |
| 5,475,845 | A | 12/1995 | Orton et al. |
| 5,752,027 | A | 5/1998 | Familiar |
| 5,805,885 | A * | 9/1998 | Leach et al. ............... 719/316 |

(Continued)

FOREIGN PATENT DOCUMENTS

EP          0846288          6/1998

OTHER PUBLICATIONS

Chappell, David, "Understanding ActiveX and OLE," 1996 Microsoft Press, pp. 4-6.

(Continued)

*Primary Examiner*—Hyung S Sough
*Assistant Examiner*—Charles E Anya
(74) *Attorney, Agent, or Firm*—Lee & Hayes, PLLC

(57) ABSTRACT

Methods of factoring operating system functions into one or more groups of functions are described. Factorization permits operating systems that are not configured to support computing in an object-oriented environment to be used in an object oriented environment. This promotes distributed computing by enabling operating system resources to be instantiated and used across process and machine boundaries. In one embodiment, criteria are defined that govern how functions of an operating system are to be factored into one or more groups. Based on the defined criteria, the functions are factors into groups and groups of functions are then associated with programming objects that have data and methods, wherein the methods correspond to the operating system functions. Applications can call methods on the programming objects either directly or indirectly that, in turn, call operating system functions.

21 Claims, 11 Drawing Sheets

U.S. PATENT DOCUMENTS

| | | |
|---|---|---|
| 6,038,558 A | 3/2000 | Powers et al. |
| 6,081,807 A | 6/2000 | Story et al. |
| 6,144,377 A | 11/2000 | Oppermann et al. |
| 6,151,639 A | 11/2000 | Tucker et al. |
| 6,182,158 B1 * | 1/2001 | Kougiouris et al. ......... 719/328 |
| 6,317,773 B1 | 11/2001 | Cobb et al. |
| 6,334,157 B1 | 12/2001 | Oppermann et al. |
| 6,356,957 B2 | 3/2002 | Sanchez, II et al. |
| 6,684,261 B1 * | 1/2004 | Orton et al. ................. 719/328 |

OTHER PUBLICATIONS

Chappell, David, "Understanding ActiveX and OLE a guide for Developers & Managers," Microsoft Press, 1996 pp. 4-8 and 245-246.

* cited by examiner

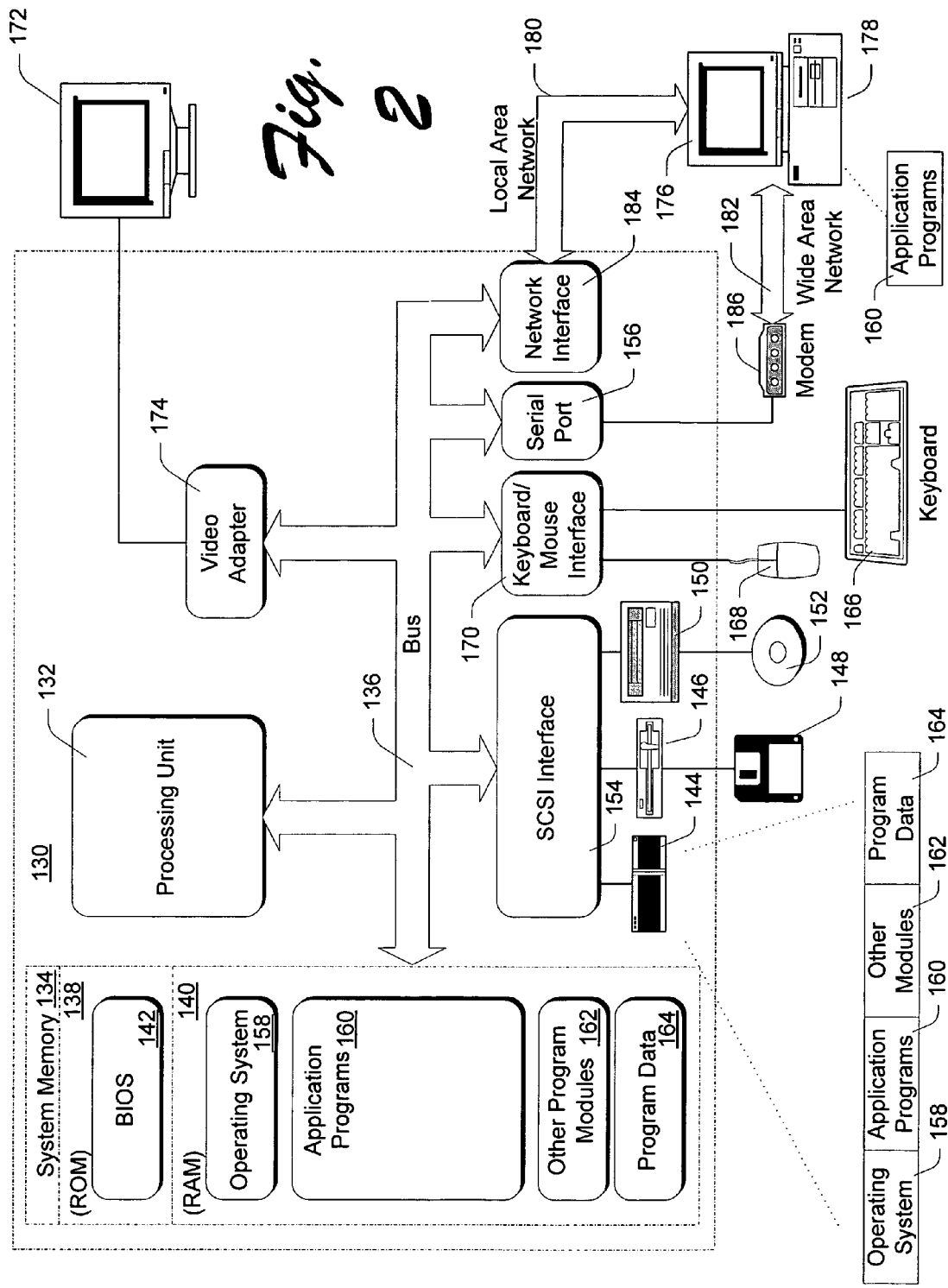

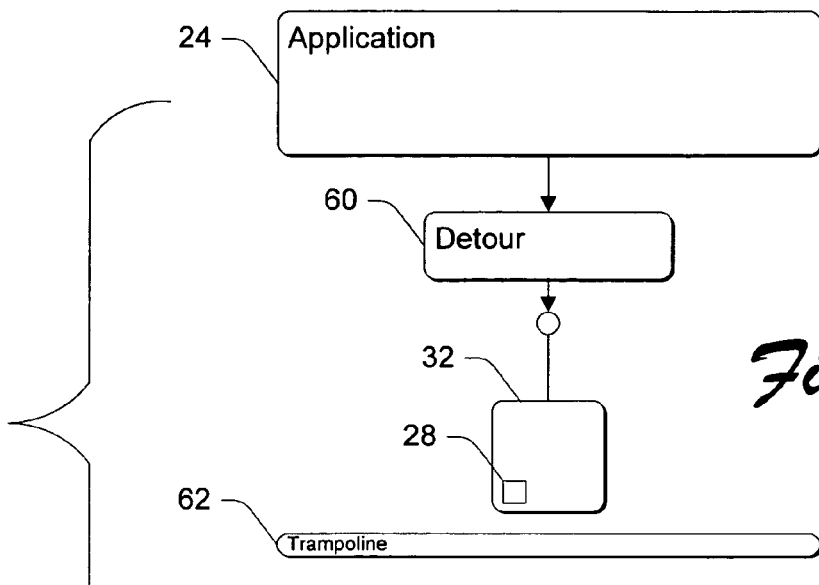
*Fig. 9*
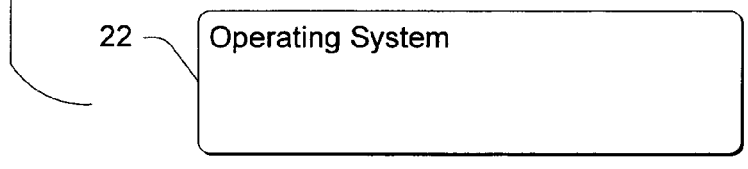
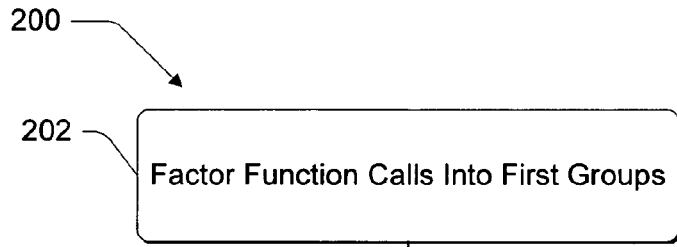
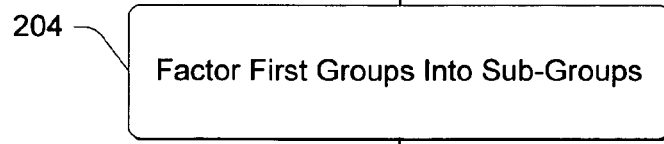
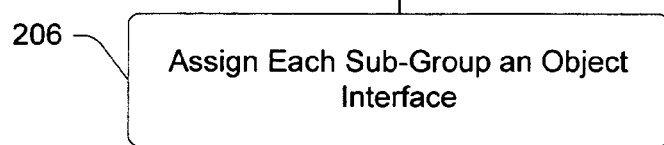
*Fig. 10*

METHODS OF FACTORING OPERATING SYSTEM FUNCTIONS, METHODS OF CONVERTING OPERATING SYSTEMS, AND RELATED APPARATUS

RELATED APPLICATIONS

The present application claims priority under 35 U.S.C. §120 as a continuation of U.S. patent application Ser. No. 10/951,306, filed Sep. 27, 2004 which is a continuation of U.S. patent application Ser. No. 09/334,104, now U.S. Pat. No. 6,826,760, filed Jun. 16, 1999, both of which are herein incorporated by reference in their entirety.

TECHNICAL FIELD

This invention relates to methods of factoring operating system functions, to methods of converting operating systems from non-object-oriented formats into object-oriented formats, and to related apparatus.

BACKGROUND OF THE INVENTION

Operating systems typically include large numbers of callable functions that are structured to support operation on a single host machine. When an application executes on the single host machine, it interacts with the operating system by making one or more calls to the operating system's functions.

Although this method of communicating with an operating system has been adequate, it has certain shortcomings. One such shortcoming relates to the increasing use of distributed computing, in which different computers are programmed to work in concert on a particular task. Specifically, operating system function libraries can severely limit the ability to perform distributed computing.

FIG. 1 illustrates the use of functions in prior art operating systems. FIG. 1 shows a system 20 that includes an operating system 22 and an application 24 executing in conjunction with the operating system 22. In operation, the application 24 makes calls directly into the operating system when, for example, it wants to create or use an operating system resource. As an example, if an application wants to create a file, it might call a "CreateFile" function at 26 to create the file. Responsive to this call, the operating system returns a "handle" 28. A "handle" is an arbitrary identifier, coined by the operating system to identify a resource that is controlled by the operating system. In this example, the application uses handle 28 to identify the newly created file resource any time it makes subsequent calls to the operating system to manipulate the file resource. For example, if the application wants to read the file associated with handle 28, it uses the handle when it makes a "ReadFile" call, e.g. "ReadFile (handle)". Similarly, if the application wants to write to the file resource it uses handle 28 when it makes a "WriteFile" call, e.g. "WriteFile (handle)".

One problem associated with using a handle as specified above is that the particular handle that is returned to an application by the operating system is only valid for the process in which it is being used. That is, without special processing the handle has no meaning outside of its current process, e.g. in another process on a common or different machine. Hence, the handle cannot be used across process or machine boundaries. This makes computing in a distributed computing system impossible because, by definition, distributed computing takes place across process and machine boundaries. Thus, current operating systems lack the ability to name and manipulate operating system resources on remote machines.

Another problem with traditional operating system function libraries is that individual functions cannot generally be modified without jeopardizing the operation of older versions of applications that might depend on the particular characteristics of the individual functions. Thus, when an operating system is upgraded it typically maintains all of the older functions so that older applications can still use the operating system.

In prior art operating systems, a function library essentially defines a protocol for communicating with an operating system. When operating systems are upgraded, the list of functions that it provides typically changes. Specifically, functions can be added, removed, or changed. This changes the protocol that is used between an application and an operating system. As soon as the protocol is changed, the chances that an application will attempt to use a protocol that is not understood by the operating system, and vice versa increase.

Prior art operating systems attempt to deal with new versions of operating systems by using so-called version numbers. Version numbers are assigned to each operating system. Applications can make specific calls to the operating system to ascertain the version number of the operating system that is presently in use. For example, when queried by an application, Windows NT 4 returns a "4" and Windows NT 5 returns a "5". The application must then know what specific protocol to use when communicating with the operating system. In addition, in order for an operating system to know what operating system version the application was designed for, a value is included in the application's binary. The operating system can then attempt to accommodate the application's protocol.

The version number system has a couple of problems that can adversely affect functionality. Specifically, a typical operating system may have thousands of functions that can be called by an application. For example, Win32, a Microsoft operating system application programming interface, has some 8000 functions. The version number that is assigned to an operating system then, by definition, represents all of the possibly thousands of functions that an operating system supports. This level of description is undesirable because it does not provide an adequate degree of resolution. Additionally, some operating systems can return the same version number. Thus, if the operating systems are different (which they usually are), then returning the same version number can lead to operating errors. What is needed is the ability to identify different versions of operating systems at a level that is lower than the operating system level itself. Ideally, this level should be at or near the function level so that a change in just one or a few functions does not trigger a new version number for the entire operating system.

The present invention arose out of concerns associated with providing improved flexibility to operating systems. Specifically, the invention arose out of concerns associated with providing operating systems that are configured for use in distributed computing environments, and that can easily support legacy applications and versioning.

SUMMARY OF THE INVENTION

Operating system functions are defined as objects that are collections of data and methods. The objects represent operating system resources. The resource objects can be instantiated and used across process and machine boundaries. Each object has an associated handle that is stored in its private state. When an application requests a resource, it is given a second handle or pseudo handle that corresponds with the handle in the object's private state. The second handle is valid across process and machine boundaries and all access to the object takes place through the second handle. This greatly facilitates remote computing. In preferred embodiments, the objects are COM objects and remote computing is facilitated through the use of Distributed COM (DCOM) techniques.

Other embodiments of the invention provide legacy and versioning support by identifying each resource, rather than the overall operating system, with a unique identifier that can specified by an application. Different versions of the same resource have different identifiers. This ensures that applications that need a specific version of a resource can receive that version. This also ensures that an application can specifically request a particular version of a resource by using its unique identifier, and be assured of receiving that resource.

Other embodiments of the invention provide legacy support by intercepting calls for operating system functions and transforming those calls into object calls that can be understood by the resource objects. This is accomplished in preferred embodiments by injecting a level of indirection between an unmodified application and an operating system.

BRIEF DESCRIPTION OF THE DRAWINGS

FIG. 2 is a diagram of a computer that can be used to implement various embodiments of the invention.

FIG. 9 is a diagram of one exemplary operating system architecture.

FIG. 10 is a flow diagram that describes processing in accordance with one embodiment of the invention.

DETAILED DESCRIPTION

Overview

Figure 1:
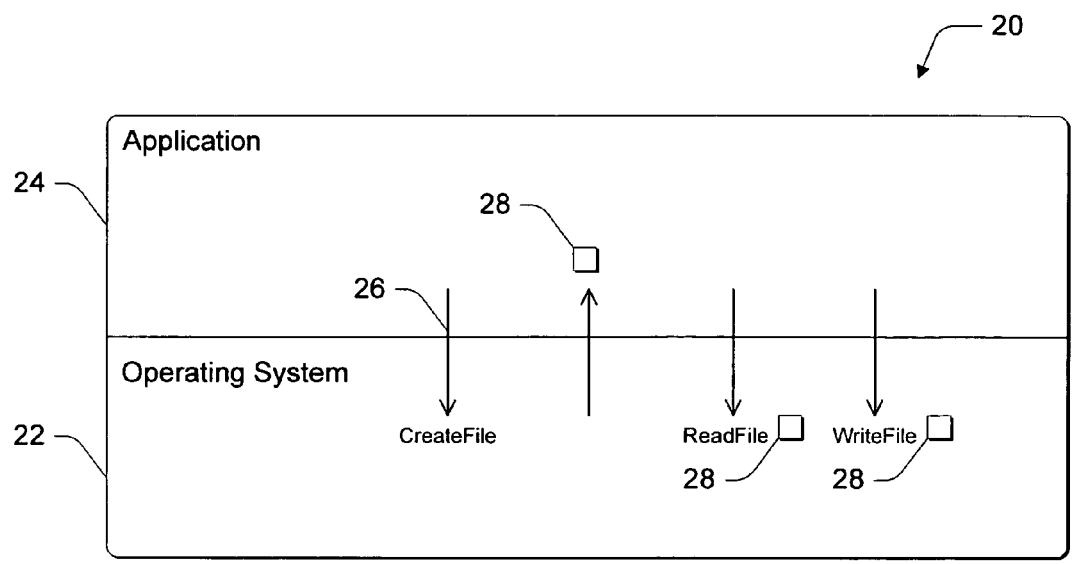
FIG. 1 is a diagram that illustrates a prior art operating system.

Various examples will be given in the context of Microsoft's Win32 operating system application programming interface and function library, commonly referred to as the "Win32 API." Although this is a specific example, it is not intended to limit the principles of the invention to only the Win32 function library or, for that matter, to Microsoft's operating systems. The Win32 operating system is described in detail in a text entitled Windows 95 WIN32 Programming API Bible, authored by Richard Simon, and available through Waite Group Press.

In accordance with one embodiment of the invention, one or more of an operating system's resources are defined as objects that can be identified and manipulated by an application through the use of object-oriented techniques. Generally, a resource is something that might have been represented in the prior art as a particular handle "type." Examples of resources include files, windows, menus and the like.

Preferably, all of the operating system's resources are defined in this way. Doing so provides flexibility for distributed computing and legacy support as will become apparent below. By defining the operating system resources as objects, without reference to process-specific "handles," the objects can be instantiated anywhere in a distributed system. This permits responsibility for different resources to be split up across process and machine boundaries. Additionally, the objects that define the various operating system resources can be identified in such a way that applications have no trouble calling the appropriate objects when they are running. This applies to whether the applications know they are running in connection with operating system resource objects or not. If applications are unaware that they are running in connection with operating system resource objects, e.g. legacy applications, a mechanism is provided for translating calls for the functions into object calls that are understood by the operating system resources objects.

In addition, factorization schemes are provided that enable an operating system's functions to be re-organized and redefined into a plurality of object interfaces that have methods corresponding to the functions. In preferred embodiments, the interfaces are organized to leverage advantages of interface aggregation and inheritance.

Preliminarily, FIG. 2 shows a general example of a desktop computer 130 that can be used in accordance with the invention. Various numbers of computers such as that shown can be used in the context of a distributed computing environment. In this document, computers are also referred to as "machines".

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

General Operating System Object Architecture

Figure 3:
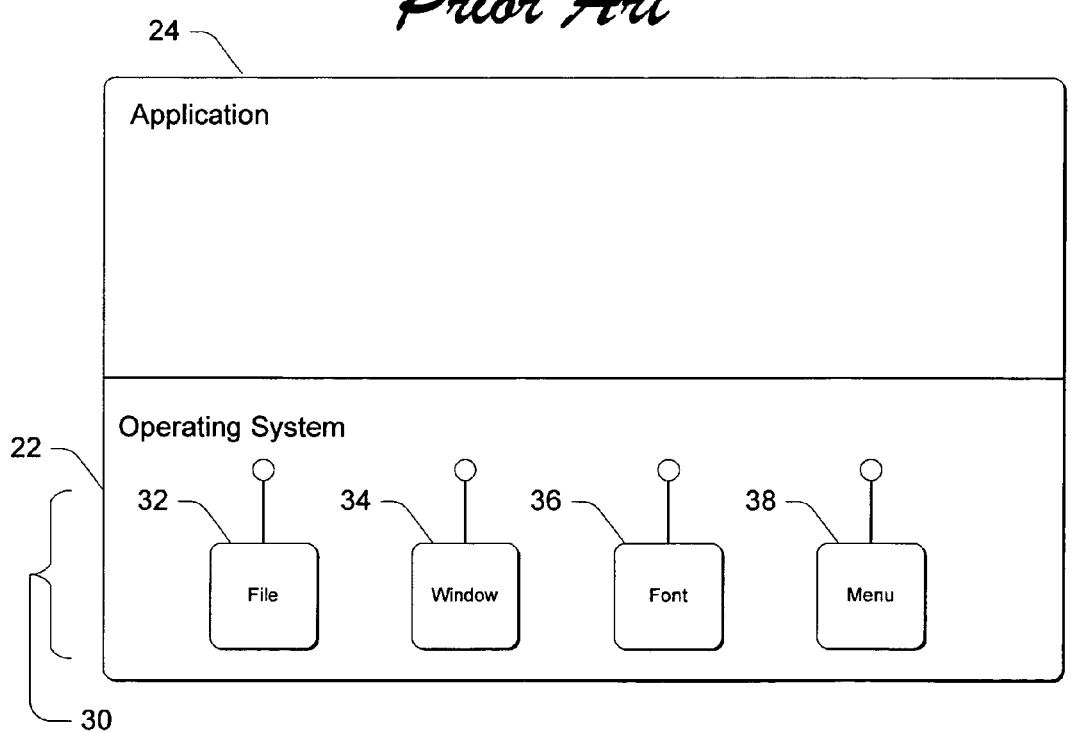
FIG. 3 is a diagram of one exemplary operating system architecture.

FIG. 3 shows an exemplary group of objects generally at 30 that represent a plurality of operating system resources 32, 34, 36, 38 within operating system 22. Resource 32 is a file resource, resource 34 is a window resource, resource 36 is a font resource, and resource 38 is a menu resource. The objects contain methods and data that can be used to manipulate the object. For example, file object 32 might include the methods "CreateFile", "WriteFile", and "ReadFile". Similarly, window object 34 might include the methods "CreateWindow", "CloseWindow" and "FlashWindow". Any number of objects can be provided and are really only limited by the number of functions that exist in an operating system, and/or the way in which the functions are factored as will become apparent below. In various embodiments, it has been found advantageous to split the functions into a plurality of objects based upon a logical relationship between the functions. One advantage of doing this is that it facilitates computing in a distributed system and limits the complexity of doing so. Specifically, by dividing the functions logically between various objects, only objects having the desired functionality are instantiated on a remote machine. For example, if all of the functions that are associated with displaying a window on a display device are contained within a single object, then only that object need be instantiated on a remote display machine, e.g. a handheld device. Although it is possible for all of the functions of an operating system to be represented by a single object, this would add to overhead during remote processing. The illustrated architecture is particularly useful for applications that are "aware" they are operating in connection with resource objects. These applications can make specific object calls to the resource objects without the need to intercept and translate their calls, as will be discussed below.

Although any suitable object model can be used to define the operating system resources, it has been found particularly advantageous to define them as COM objects. COM objects are well known Microsoft computing mechanisms and are described in a book entitled Inside OLE, Second Edition 1995, which is authored by Kraig Brockschmidt. In COM, each object has one or more interfaces that are represented by the plug notation used in FIG. 3. An interface is a group of semantically related functions or methods. All access to an object occurs through member functions of an interface. Representing the operating system resources as objects provides an opportunity to redefine the architecture of current operating systems, and to provide new architectures that improve upon the old ones.

One advantage of representing resources as COM objects comes in the remote computing environment. Specifically, when COM objects are instantiated throughout a distributed computing system, Distributed COM (DCOM) techniques can be used for remote communication. DCOM is a known communication protocol developed by Microsoft.

Figure 4:
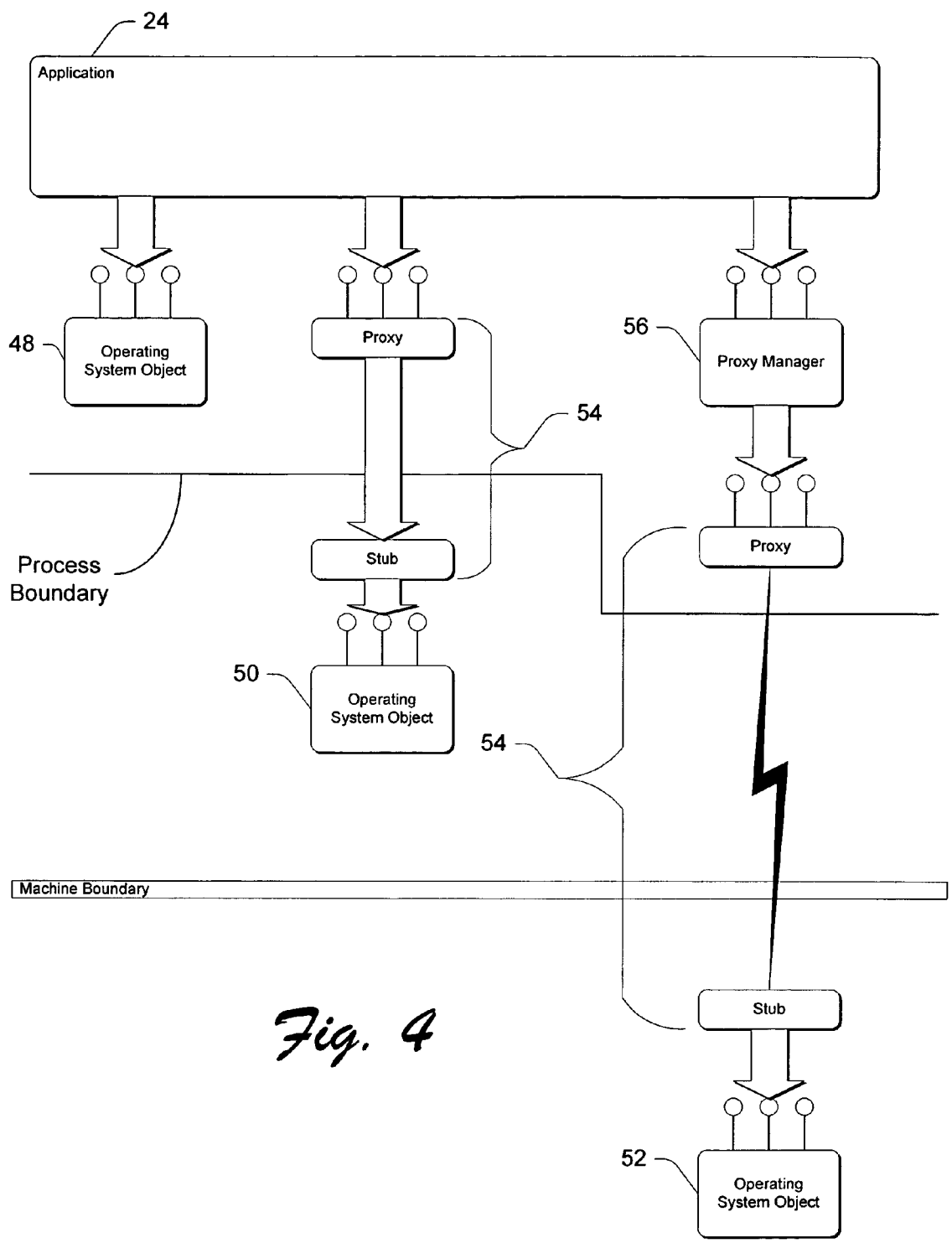
FIG. 4 is a high level diagram of an operating system having a plurality of its resources defined as objects and distributed across process and machine boundaries.

FIG. 4 shows an exemplary distribution of an operating system's resources across one process boundary and one machine boundary in a distributed computing system. In the described example, resource object 48 is instantiated in-process (i.e. inside the application's process), resource object 50 is instantiated in another process on the same machine (i.e. local), and resource object 52 is instantiated on another machine (i.e. remote). The instantiated resource objects are used by the application 24 and constitute a translation layer between the application and the operating system. Specifically, the application makes object calls on the resource objects. The resource objects, in turn, pass the calls down into the operating system in a manner that is understood by the operating system. One way of doing this is through the use of handle/pseudo handle pairs discussed in more detail below.

Figure 5:
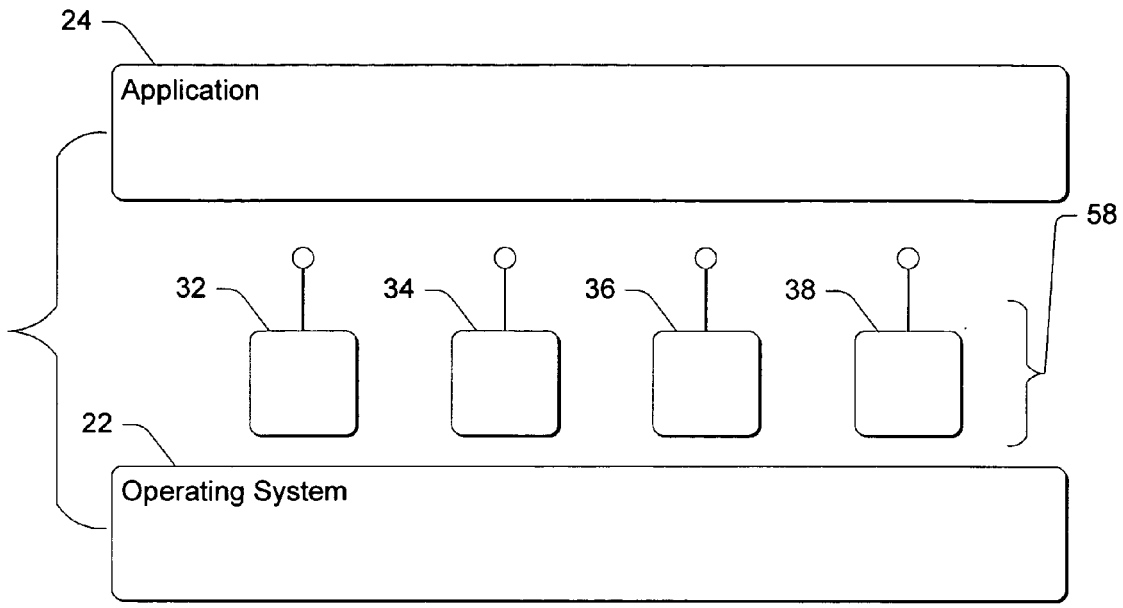
FIG. 5 is a diagram of an exemplary architecture in accordance with one embodiment of the invention.

In order to use the resource objects, the application must first be able to communicate with them. In one embodiment where the operating system resources comprise COM objects, communication takes place through the use of known DCOM techniques. Specifically, in the local case where resource 50 is instantiated across a process boundary, DCOM provides for an instantiated proxy/stub pair 54 to marshal data across the process boundary. The remote case also uses a proxy/stub pair 54 to marshal data across the process and machine boundaries. In addition, an optional proxy manager 56 can be instantiated or otherwise provided to oversee communication performed by the proxy/stub pair, and to take measures to reduce unnecessary communication. Specifically, one common proxy manager task is to cache remote data to avoid unnecessary communication. For example, in the Win32 operating system, information can be cached to improve the re-drawing of remote windows. When a Begin-Paint( ) call is made, it signals the beginning of a re-draw operation by creating a new drawing context resource. In order to be available remotely, this resource has to be wrapped by an object. Rather than creating a new object instance on each re-draw operation, an object instance can be cached in the proxy manager and re-used for the re-draw wrapper Translation Layer FIG. 5 shows a translation layer 58 comprising resource objects 32, 34, 36, and 38. Translation layer 58 is interposed between an application 24 that is configured to make resource object calls, and an operating system 22 that is not configured to receive the resource object calls. In this example, application 24 is not a legacy application because those applications directly call functions in the operating system. Translation layer 58 works in concert with application 24 so that the application's resource object calls can be used by the object to call functions of the operating system.

Figure 6:
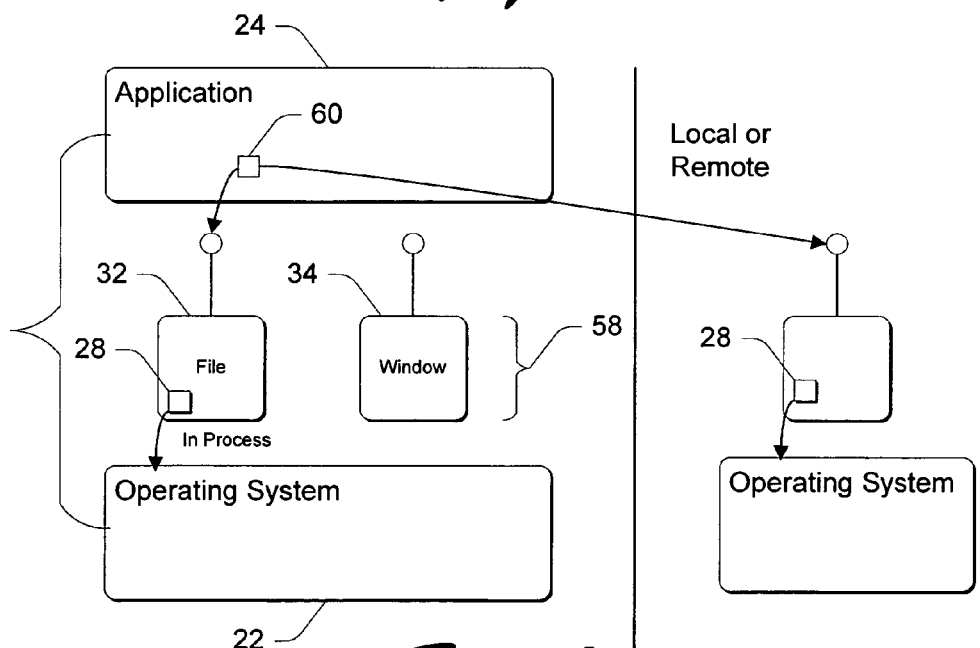
FIG. 6 is a diagram that illustrates operational aspects of one embodiment of the invention.

FIG. 6 shows one way that translation layer 58 translates resource object calls from the application 24 into calls to operating system functions. Here, the operating system resources are defined as COM objects that have one or more interfaces that are called by the application. Because the COM objects can be instantiated either in process, locally, or remotely, the standard handle that was discussed in the "Background" section cannot be used. Recall that the reason for this is that the handle is only valid in its own process, and not in other processes on the same or different machines. To address and overcome the limitations that are inherent with the use of this first handle, aspects of the invention create a second or "pseudo" handle and associate it with the first handle. The second handle is preferably valid universally, outside the process of the first handle. This means that the second handle is valid across multiple machine and process boundaries. The application uses the second handle instead of the first handle whenever it creates or manipulates an operating system resource.

In operation, an application initially calls a resource object in the translation layer 58 when it wants to create a resource to use. An application may, for example, call "CreateFile" on a file object to create a file. The application is then passed a pseudo-handle 60 instead of the first handle 28 for the file object. The first handle 28 is stored in the object instance's private state, i.e. it remains with its associated object. This means that the file object has its own real handle 28 that it maintains, and the application has a pseudo handle 60 that corresponds to the real handle. Application 24 makes object calls to the object of interest using the pseudo-handle 60. The object takes the pseudo-handle, retrieves the corresponding handle 28 and uses it to call functions in the operating system. The application uses the pseudo-handle 60 for all access to the operating system resource. In a preferred embodiment, pseudo-handle 60 is an interface pointer that points to an interface of the object of interest.

With an appropriate pseudo-handle, an application is free to access any of the resources that are associated with an object that corresponds to that handle. This means that the application uses the pseudo-handle 60 to make subsequent calls to, in this example, the file object. For example, calls to "ReadFile" and "WriteFile" now take place using the pseudo handle 60. When the application makes a call using the pseudo handle 60, the object determines the real handle that corresponds to the pseudo-handle. Any suitable method can be used such as a mapping process. If the object is in process, then the call gets passed down to the operating system 22 using first handle 28 as shown. If the object is local or on another machine, then communication takes place with the object at its current location across process and machine boundaries. Where the operating system resources are defined as COM objects, DCOM techniques can be used to call across process and machine boundaries.

Legacy Application Support

Figure 7:
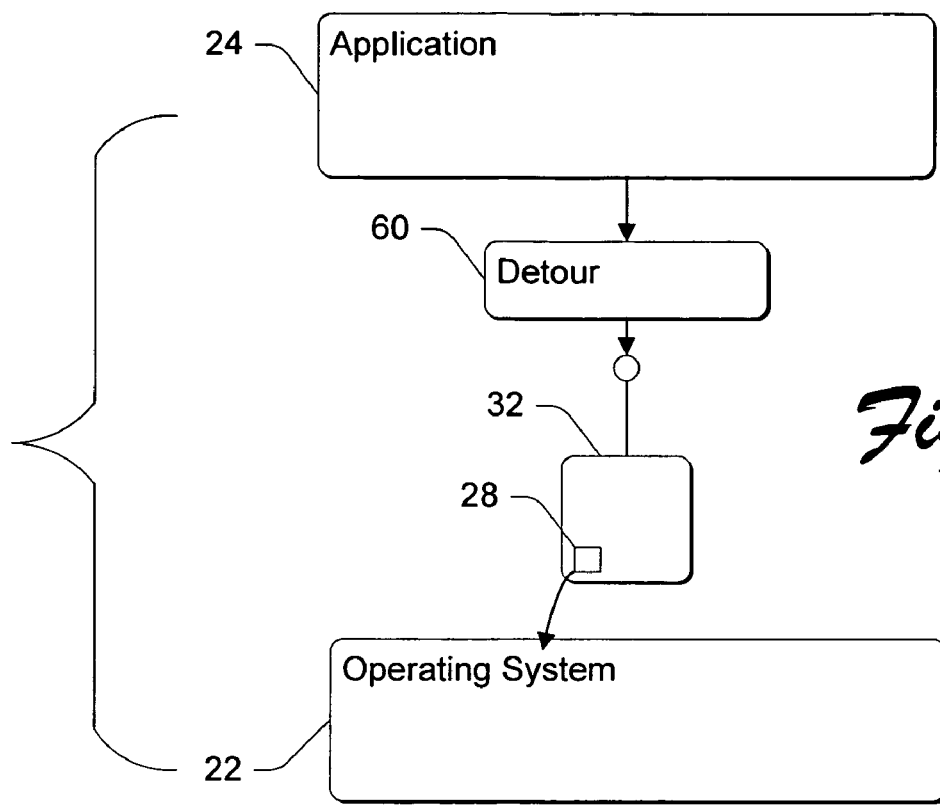
FIG. 7 is a diagram of one exemplary operating system architecture.
Figure 8:
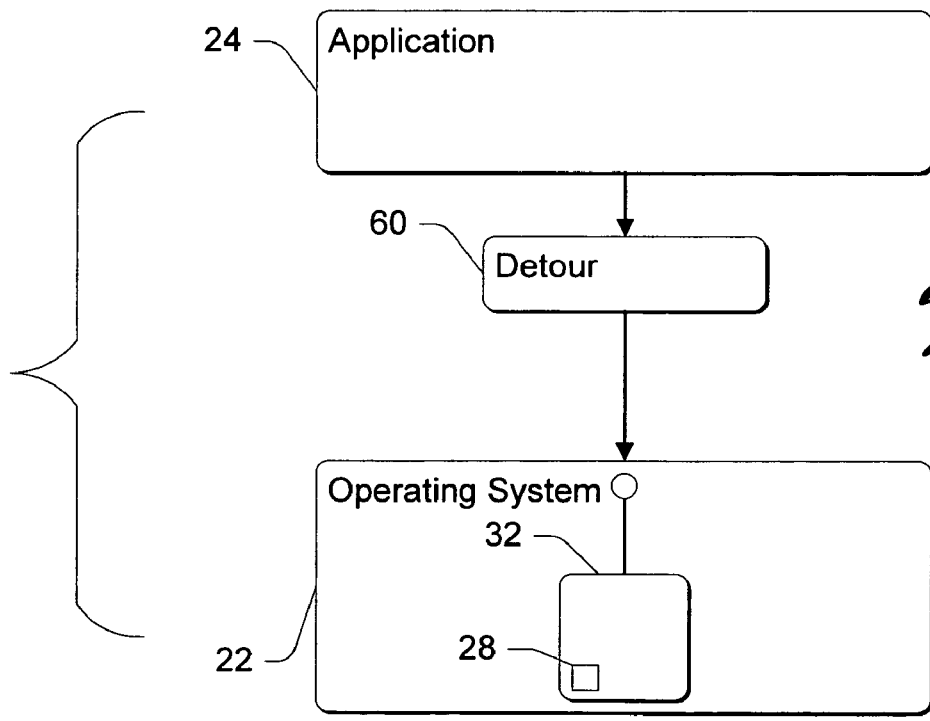
FIG. 8 is a diagram of one exemplary operating system architecture.

FIGS. 7 and 8 show two different architectures that can be used in connection with legacy applications. FIG. 7 includes an operating system that is the same as the one described in connection with FIG. 5. FIG. 8 includes an operating system that is the same as the one described in connection with FIG. 3.

Recall that legacy applications are those that call operating system functions instead of objects. These types of applications do not have any way of knowing that they are running in connection with a system whose resources are defined as objects. Hence, when an application calls a function, it "believes" that the function is supported by and accessible through the operating system. The syntax of the function calls, however, is not understood by the objects. Embodiments of the invention translate the syntax of the function calls into syntax that is understood by the objects. In accordance with one embodiment, application calls are intercepted and transformed before reaching the operating system. The transformed calls are then used to call the appropriate object using the syntax that it can understand. Then the object passes the calls into the operating system as was described above in connection with FIG. 6.

In one implementation, a detour 60 is provided that implements a detour function. Detour 60 is interposed between the application and the operating system. When an application calls a function, detour 60 intercepts the call and transforms it into an object call. In preferred embodiments, detour 60 enables communication across at least one and preferably more process and machine boundaries for remote computing. Where the objects are COM objects, communication takes place through DCOM techniques discussed above.

To understand how one embodiment of detour 60 works, the following example is given. Syntactically, detour 60 changes the syntax of an application's call to an operating system function into one that is understood by an object. For example, a prior art call might use the following syntax to call "ReadFile": ReadFile(handle, buffer, size), where "handle" specifies a file resource that is to be read. There are many different resources that can be read using the ReadFile function, e.g. a file, a pipe, and a socket.

When a prior art operating system is called in this manner, the operating system typically looks for the code that is associated with reading the particular type of resource that is specified by the handle, and then reads the resource using the code. One way prior art operating systems can do this is to have one lengthy "IF" statement that specifies the code to be used for each different type of resource. Thus, if a new resource is to be added, the "IF" statement must be modified to provide for that type of resource.

Detour 60 greatly streamlines this process by translating the "ReadFile" call syntax into one that can be used by the specified resource. So in this example, the original "handle"

actually specifies an object. The new syntax for the object call is represented as "handle→ReadFile (buffer, size)". Here, "handle" is the object and "ReadFile" is an object function or method. In COM embodiments, the "ReadFile" method of the handle object is accessed through the object's vtable in a known manner. This configuration allows an object to contain only the code that is specifically necessary to operate upon it. It need not contain any code that is associated with other types of objects. This is advantageous because new objects can be created simply by providing the code that is uniquely associated with it, rather than by modifying a lengthy "IF" statement. Each object is self-contained and does not impact or affect any of the other objects. Nor does its creation affect the run time of any other objects. Only those applications that need a specific object will have it created for their use. Another advantage is the ease with which objects can be accessed. Specifically, applications can access the various objects through the use of pseudo-handles which are discussed above.

Detour 60 constitutes but one way of making a syntactic transformation from one format that cannot be used with resource objects to a format that can be used with resource objects. This supports legacy applications that do not "know" that they are running on top of a system whose resources are provided as objects. So, to the application it appears as if its calls are working just the same as they ever did.

Detour Implementation

When an application is built, it links against a set of dynamic linked libraries or (DLLs). The DLLs contain code that corresponds to the particular calls that an application makes. For example, the call "CreateFile" is contained in a DLL called "kernel32.dll". At run time, the operating system loads "kernal32.dll" into the address space for the application. Detour 60 contains a detour call for each call that an application makes. So, in this example, detour 60 contains a call "Detour_CreateFile". The goal of detour 60 is to call the "Detour_CreateFile" called every time the application calls "CreateFile". This provides a level of indirection when the application makes a call to the operating system. The indirection enables certain decisions to be made by detour 60 that relate to whether a call is made locally or remotely.

As an example, consider the following. If an application desires to use a "WriteFile" call to write certain data to a particular file remotely, but also to write certain other data to a file locally, then a redirected "Detour_WriteFile" call can determine that there is a local operation that must take place, as well as a remote operation that must take place. The "Detour_WriteFile" call can then make the appropriate calls to ensure that the local operation does in fact take place, and the appropriate calls to ensure that the remote operations do in fact take place.

One way of injecting this level of indirection into the call is to manipulate the call's assembly code. Specifically, portions of the assembly code can be removed and replaced with code that implements the detour. So, using the "CreateFile" call as an example, the first few lines of code comprising the "CreateFile" call are removed and replaced with a "jump" instruction that calls "Detour_CreateFile". For those operating systems that do not natively implement resource objects, a trampoline 62 (FIG. 9) is provided and receives the lines of code that are removed, along with another jump instruction that jumps back to the original "CreateFile" call. Now, when application 24 calls "CreateFile", detour 60 automatically calls "Detour_CreateFile". If there is local processing that must take place, the "Detour_CreateFile" can call trampoline 62 to invoke the original local "CreateFile" sub-routine. Otherwise, if there is remote processing that must take place, the detour 60 can take the appropriate steps to ensure that remote processing takes place. In this manner, the detour 60 wedges between the application and the operating system with a level of indirection. The indirection provides an opportunity to process either locally or remotely.

One of the primary advantages of detour 60 in the COM embodiments is the remoting capabilities provided by DCOM. That is, because the operating system's resources are now modeled as COM objects, DCOM can be used essentially for free to support communication with local or remote processes or machines.

Linking Against Detours

One way that detours can be implemented is to modify the dynamic link library (DLL) that an application links against. Specifically, rather than link against DLLs and their associated functions, an application links directly against detour functions, e.g. "detour32.dll" instead of "kernel32.dll". Here, "detour32.dll" contains the same function names as "kernel32.dll". However, rather than providing the kernel's functionality, "detour32.dll" contains object calls. Thus, an application makes a function call to a function name in the "detour32.dll" which, in turn, makes an object call.

With the "detour.dll", all of the function calls are translated into COM calls. The trampoline 62 is loaded and is hardwired so that it knows where to jump to the appropriate places in the kernal32.dll.

Version Support

Another aspect of the invention provides support for different versions of a resource within an operating system. Recall that in the prior art, operating system versions are simply represented by a version number. The version number represents the entire collection of operating system functions. Thus, a modification to a handful of operating system functions might spawn a new operating system version and version number. Yet, many if not most of the original functions remain unchanged. Because of this, version numbers provide an undesirable degree of description. In addition, recall that previous operating systems maintain vast function libraries that include all of the functions that an application might need. Function calls cannot be deleted because legacy applications might need them. This results in a large, bulky architecture of collective functions that is not efficient.

While the functionality of these functions must be maintained to support legacy applications, various embodiments of the invention do so in a manner that is much less cumbersome and much more efficient. Specifically, embodiments of the invention create the necessary resources for legacy applications only when they are needed by an application. The resources are defined as objects that are collections of data and methods. Each object only contains the methods that pertain to it. No other resources are created or maintained if they are not specifically needed by an application. This is made possible, in the preferred embodiment, through the use of COM objects that encapsulate the functionality of the requested resources.

Accurate version support is provided by the way in which object interfaces are identified. Specifically, each object interface has its own unique identifier. Each different version of a resource is represented by a different interface identifier. An application can specifically request a unique identifier when it wants a particular version of a resource.

One way of implementing this in COM is as follows. As background, every interface in COM is defined by an interface identifier, or IID that is formed by a globally unique identifier or "GUID". GUIDs are numbers that are generated by the operating system and are bound by the programmer or a development tool to the interfaces that they represent. By programming convention, no two incompatible interfaces can ever have the same IID. One of the rules in COM that accompanies the use of these GUIDs is that if an interface changes in any way whatsoever, so too must its associated IID change. Thus, IIDs and interfaces are inextricably bound together and provide a way to uniquely identify the interface with which it is associated over all other interfaces in its operating universe.

In the present invention, every operating system function is implemented as a method of some interface that has its own assigned unique identifier. In the preferred embodiment, the unique identifier comprises a GUID or IID. Other unique identifiers can, of course, be used. An application that uses a set of functions now specifies unique identifiers that are associated with the functions. This assures the application that it will receive the exact versions of the functions or methods that it needs to execute. In addition, in those circumstances where the resources are instantiated across a distributed system, the unique identifiers are specified across multiple process and machine boundaries. In a preferred embodiment, the applications store the appropriate unique identifiers, GUIDs, or IIDs in their data segment.

One of the benefits of using unique identifiers or IIDs is that each represents the syntax and the semantics of an interface. If the syntax or the semantics of an interface changes, the interface must be assigned a new identifier or IID. By representing the operating system resources as COM objects that support these interfaces, each with their own specific identifier or IID, applications can be assured of the desired call syntax and semantics when specific interfaces are requested. Specifically and with reference to the COM embodiments, an application that knows it is operating on an operating system that has its resources defined as COM objects can call QueryInterface on a particular object. By specifying the IID in the QueryInterface call, the application can determine whether that object implements a specific version of a specific interface.

In addition, embodiments of the invention can provide an operating system with the ability to determine, based on the specified unique identifier, whether it has the resource that is requested. If it does not, the operating system can ascertain the location of the particular resource and retrieve it so that the application can have the requested resource. The location from which the resource is retrieved can be across process and machine boundaries. As an example, consider the following. If an application asks for a specific version of a "ReadFile" interface, and the operating system does not support that version, the operating system may know where to go in order to download the code to implement the requested functionality. Software code for the specific requested interface may, for example, be located on a web site to which the operating system has access. The operating system can then simply access the web site, download the code, and provide the resource to the application.

Linking Against Unique Identifiers

When an application is linked, it typically links against a set of DLL names and entry points in a known manner. The DLLs contain code that corresponds to the particular calls that an application will need to make. So for example, if an application knows that it is going to need the call "CreateFile", it will link against the DLL name that includes the code for that call, e.g. "kernel32.dll". At run time, a loader for the operating system loads "kernel32.dll" into the address space for the application. Linking against DLLs in this manner does not support versioning because there is no way to specify a particular version of a resource.

To address this and other problems, one embodiment of the invention establishes a library that contains unique identifiers for one or more interfaces, e.g. GUIDs, and the method offsets that are associated with the unique identifiers. The method offsets correspond to the vtable entry for the unique identifier. An application is then linked against the unique identifiers. For example, when an application is compiled, it is linked against one or more ".lib" or library files. A linker is responsible for taking the ".lib" files that have been specified by the application and looking for the functions or methods that are needed by the application. When the linker finds the appropriate specific functions, it copies information out of the ".lib" file and into the binary image of the application. This information includes the name of the DLL containing the functions, and the name of the function. Linking by GUID and method offset can be accomplished by simply modifying the library or ".lib" files by replacing the DLL names and function names with the GUIDs and method offsets. This change does not affect the application, operating system, or compiler. For example, DLL names typically have the form "xxxxxx.dll". The GUID identifier, on the other hand, is represented as a hexadecimal string that is specified by a set of brackets "{}". The linker and the loader can then be modified by simply specifying that they should look for the brackets, instead of looking for the "xxxxxx.dll" form. This results in loading only those specific interfaces (containing the appropriate methods) that are needed for an application instead of any DLLs. This supports versioning because an application can specifically name, by GUID, the specific interfaces that it needs to operate. Accordingly, only those interfaces that constitute the specific version that an application requests are loaded.

Factorization

Factorization involves looking at a set of functions and reorganizing the functions into defined interfaces based upon some definable logical relationship between the functions. In the described embodiment of the invention, the existing functions of an operating system are factored and assigned to different interfaces, so that the functions are now implemented as interface methods. The interfaces are associated with objects that represent underlying operating resources such as files, windows, etc. In this context, an "object" is a data structure that includes both data and associated methods. The objects are preferably COM objects that can be instantiated anywhere throughout a remote computing system. Factoring the function calls associated with an operating system's resources provides independent operating system resources and promotes clarity. It also promotes effective, efficient versioning, and clean remoting of the resources.

FIG. 10 shows a flow diagram at 200 that describes factorization steps in accordance with one embodiment of the invention. Step 202 factors function calls into first interface groups based upon a first criteria. An exemplary first criteria takes into account the particular items or underlying resources associated with the operation of a function, or the particular manner in which a function behaves. For example, some functions might be associated only with a window resource in that they create a window or allow a window to be manipulated in some way. These types of functions are placed into a first group that is associated with windows. An exemplary first interface group might be designated IWin32 Window.

Step 204 factors the first groups into individual sub-groups based upon a second criteria. An exemplary second criteria is based upon the nature of the operation of a function on the particular item or resource with which it is associated. For example, by nature, some functions create resources such as windows, while other functions do not create resources. Rather, these other functions have an effect on, or operate in some manner on a resource after it has been created. Accordingly, step 204 considers this operational nature and assigns the functions to different sub-groups based upon operational differences. In one embodiment, the groups are factored into sub-groups by considering the call parameters and return values that the functions use. This permits factorization to take place based upon each function's use of a handle. As an example, consider the following five functions:

HANDLE CreateWindow( . . . );
    int DialogBoxParam( . . . , HANDLE, . . . );
    int FlashWindow(HANDLE, . . . );
    HANDLE GetProp (HANDLE, . . . )
    imt GetWindowText(HANDLE, . . . );

A loaded operating system resource is exported to the application as an opaque value called a kernel handle. Functions that create kernel handles (i.e., resources) are moved to a "factory" interface, and functions that then query or manipulate these kernel handles are moved to a "handle" interface. Accordingly, step 206 assigns the sub-groups to different object interfaces. For example, those functions that create a window are assigned into an interface sub-group called IWin32WindowFactory, while those functions that do not create a window, but rather operate on it in some way are assigned into an interface sub-group called IWin32WindowHandle. Each interface represents a particular object's implementation of its collective functions. Objects can now be created or instantiated that include interfaces that contain one or more methods that correspond to the functions. Objects can be instantiated anywhere in a remote computing environment.

In a further extension of the factorization, consideration is given to functions that act upon a number of different resources. For example, Win32 has several calls that synchronize on a specified handle. The specified handle can represent a standard synchronization resource, such as a mutual exclusion lock, or less common synchronization resources such as processes or files. By simply factoring the functions as described above, this relationship would be missed. For example, the synchronization calls would be placed in a IWin32SyncHandle interface, while the process and file calls would be placed in IWin32ProcessHandle and IWin32FileHandle interfaces, respectively. In order to capture the relationship between these functions though, the process and file interfaces should also include the synchronization calls. Because the process and file handles can be thought of as logically extending the functionality of the synchronization handle, the concept of interface inheritance can be used to ensure that this takes place. Accordingly, both the IWin32ProcessHandle and IWin32FileHandle will thus inherit from the IWin32SyncHandle interface. This means that the IWin32ProcessHandle and IWin32FileHandle interfaces contain all the methods of the IWin32SyncHandle interface, in addition to their own methods.

Figure 11:
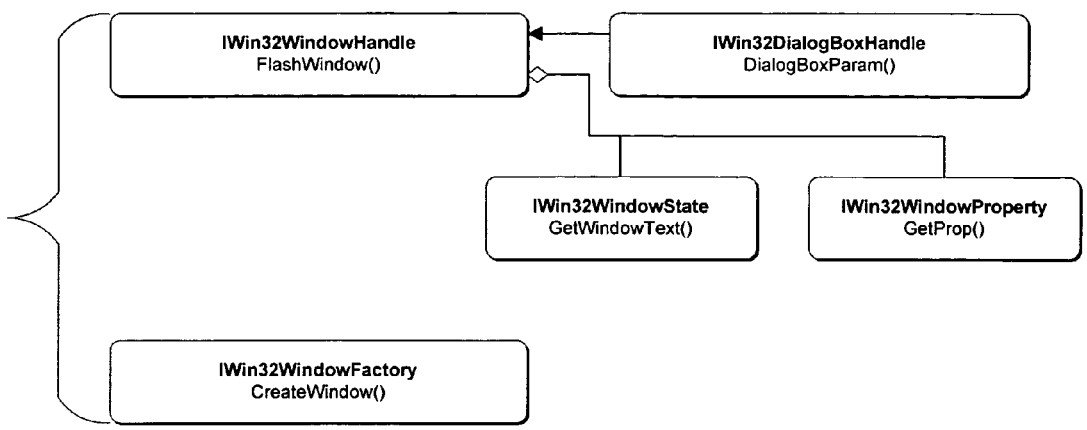
FIG. 11 is a block diagram that illustrates one aspect of an interface factoring scheme.
Figure 12:
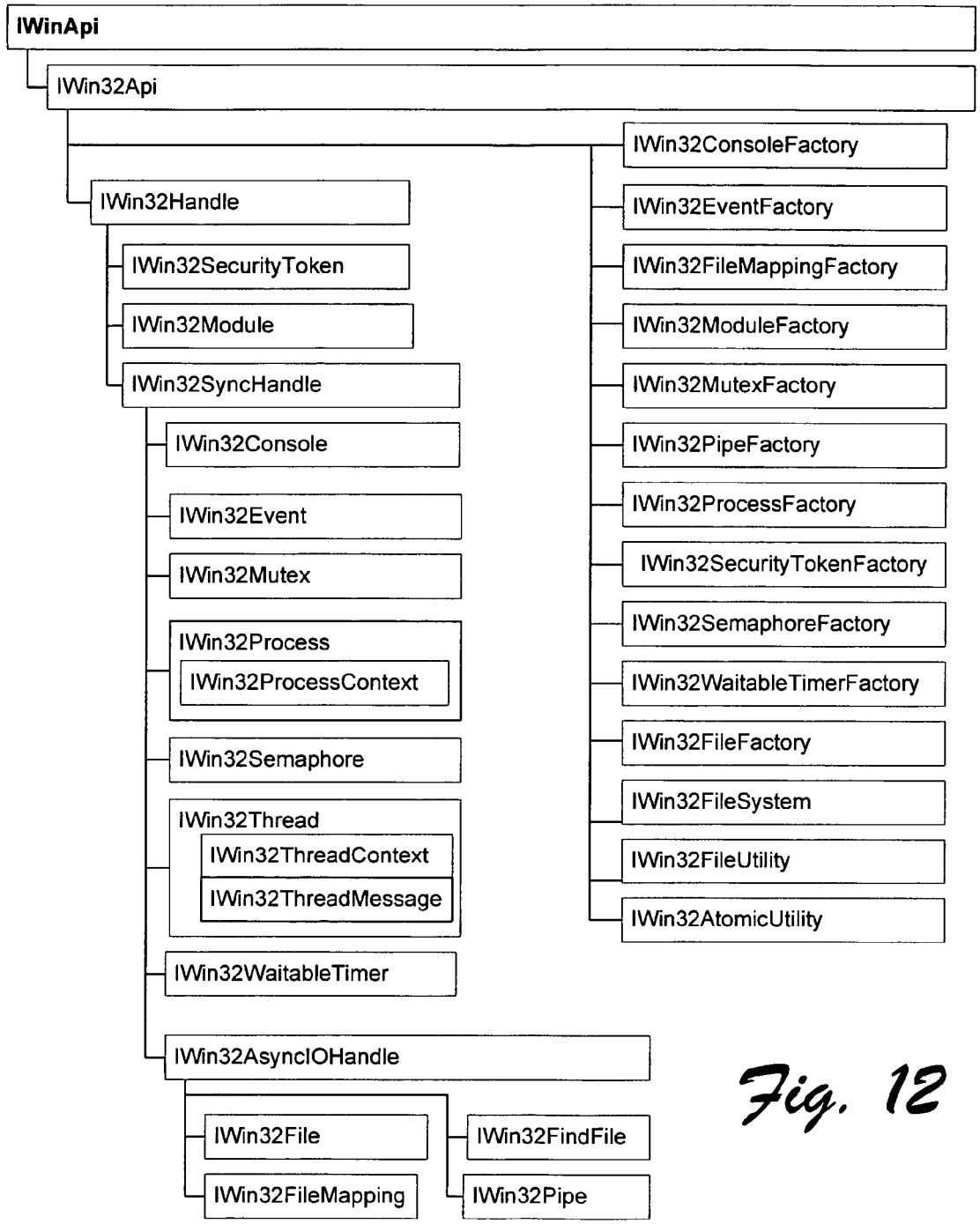
FIGS. 12-15 are diagrams of interface hierarchies in accordance with one embodiment of the invention.
Figure 13:
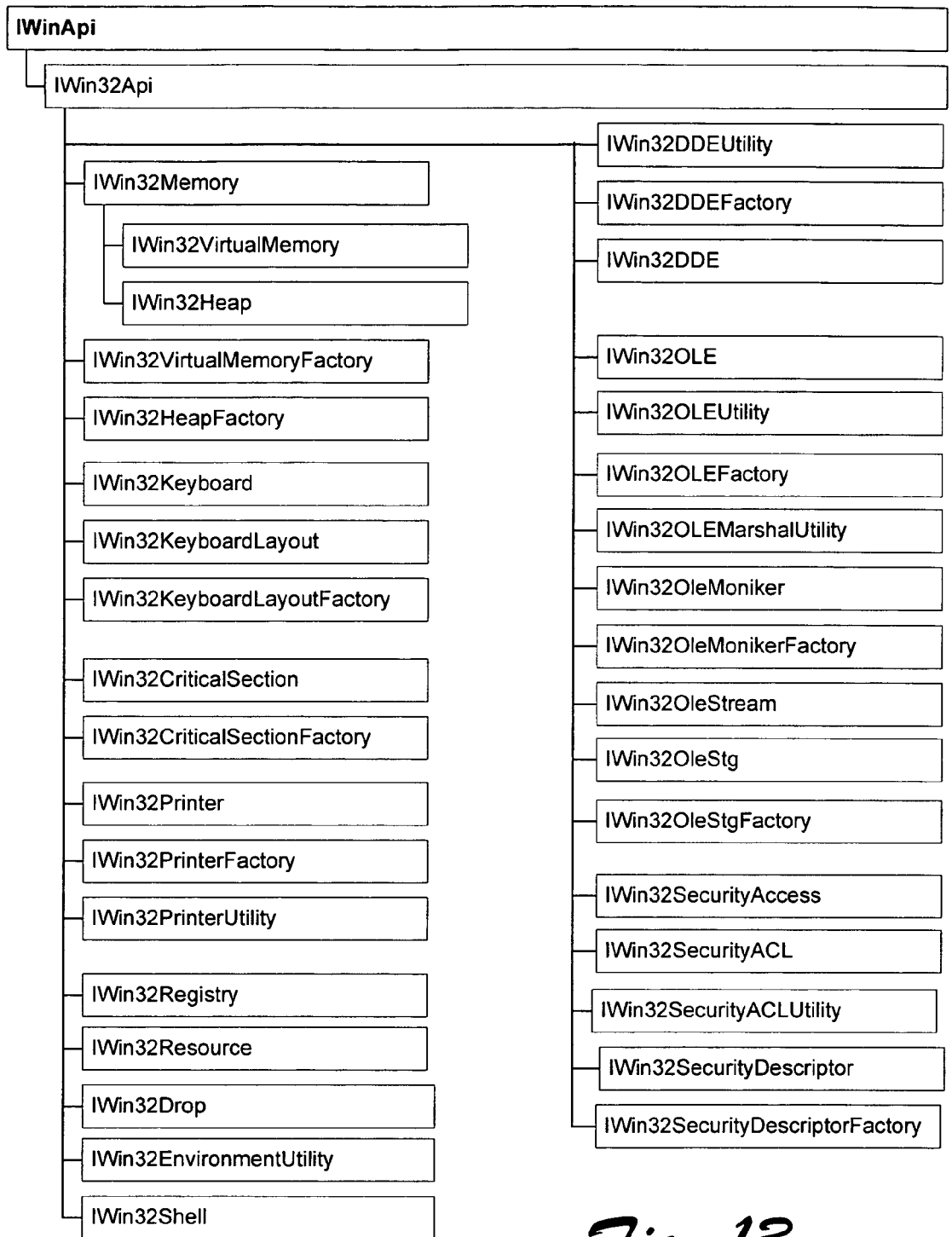
Figure 14:
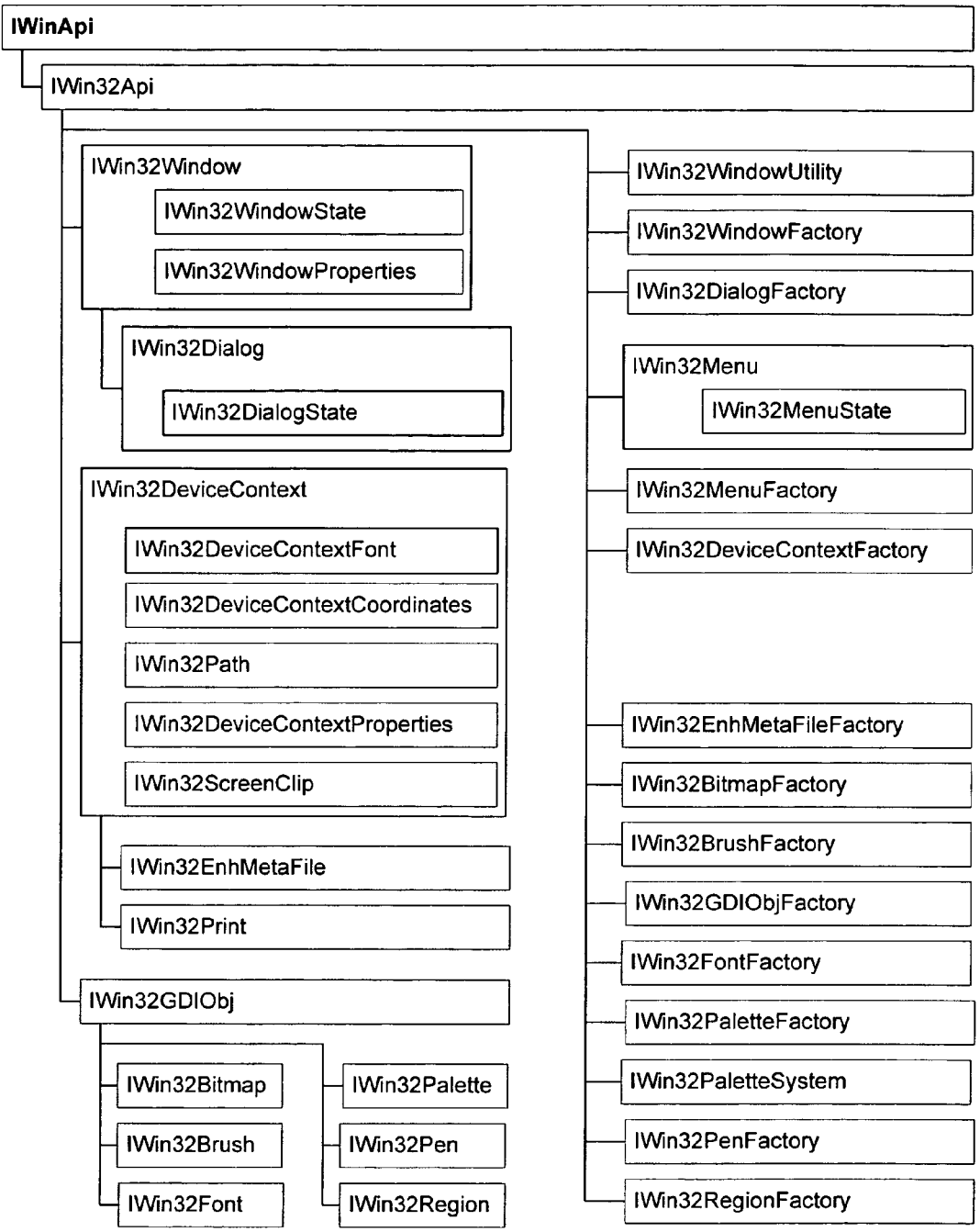
Figure 15:
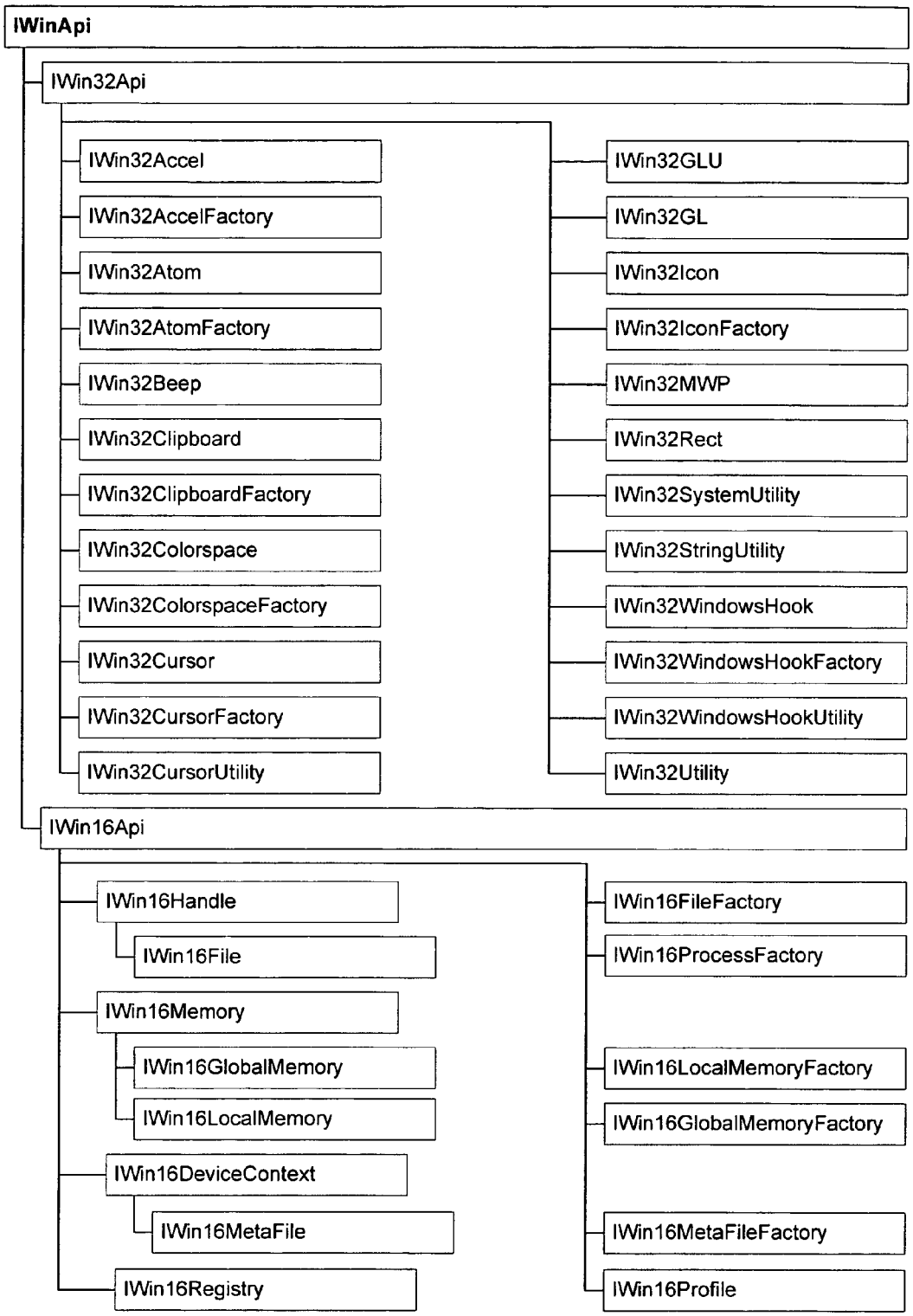

To assist in further understanding of the factorization scheme, the following example is given by considering again the five functions listed above. FIG. 11 constitutes a small but exemplary subset of the 130+ window functions in the Win32 operating system. The "CreateWindow( )" function creates a window. The remaining functions execute a dialog box, flash the window's title bar, query various window properties, and return the current text in the window title bar. These functions all operate on windows in some way and are first factored into a windows group. Next, the functions are further factored depending on their use of kernel handles (denoted by "HANDLE" in the above functions). Since "Create Window( )" creates a handle or window, it is factored into a factory sub-group called IWin32WindowFactory. Since the other functions do not create a window, but only operate on or relative to one, they are placed in a handle sub-group called IWin32WindowHandle. In a third step, the IWin32WindowHandle sub-group is further factored into IWin32 WindowState and IWin32Property interfaces. The State and Property interfaces are said to compose the IWin32WindowHandle interface. This composition is modeled through interface aggregation. The dialog calls are factored into their own interface since they are logical extensions of the windows. This is modeled through interface inheritance. Interface aggregation and inheritance are discussed in more detail in the Brockschmidt text above.

To further assist in understanding the factorization scheme, FIGS. 12-15 are provided, as well as the factorization list below. FIGS. 12-15 lists the interface hierarchy and factoring of a subset of more than one thousand functions of the Win32 operating system. The subset contains the necessary Win32 functions to support three operating system-intensive applications: Microsoft PhotoDraw, the Microsoft Developers' Network Corporate Benefits sample, and Microsoft Research's Octarine. The first is a commercial image manipulation package, the second is a widely distributed sample three-tiered, client-server application, and the third is a prototype COM-based integrated productivity application. All obsolete Windows 3.1 (16-bit) calls have been placed in IWin16 interfaces. In implementation, the top-level call prototypes will mirror their Win32 counterparts, with the appropriate parameters replaced by interface pointers. Note that these calls can wrap lower-level methods that implement different parameters. For example, the lower level methods could return descriptive HRESULTs directly and the Win32 return types as OUT parameters. Additionally, ANSI API calls can be implemented as wrappers of their UNICODE counterparts. The wrappers will simply perform argument translation and then invoke the counterpart.

The factorization list below lists the interface hierarchy. Inheritance relationships are clearly shown by the connecting lines, while aggregation is pictured by placing one interface block within another. This section also lists the call factorization. In the factorization list, "X:Y" denotes that X inherits from Y, and "Y←X" denotes that X is aggregated into Y.

Factorization List

Generic Handles
  IWin32Handle
    CloseHandle
Atoms
  IWin32Atom
    GlobalDeleteAtom
    GlobalGetAtomNameA
  IWin32AtomFactory
    GlobalAddAtomA
Clipboard
  IWin32Clipboard
    ChangeClipboardChain
    CloseClipboard
    GetClipboardData
    GetClipboardFormatNameA
    GetClipboardFormatNameW
    GetClipboardOwner
    GetClipboardViewer
    GetOpenClipboardWindow
    IsClipboardFormatAvailable
    SetClipboardData
  IWin32ClipboardFactory
    RegisterClipboardFormatA
    RegisterClipboardFormatW
Console

| Factorization List |
|---|
| IWin32Console : IWin32SyncHandle |
|   GetConsoleMode |
|   GetNumberOfConsoleInputEvents |
|   PeekConsoleInputA |
|   ReadConsoleA |
|   ReadConsoleInputA |
|   SetConsoleMode |
|   SetStdHandle |
|   WriteConsoleA |
| IWin32ConsoleFactory |
|   AllocConsole |
|   GetStdHandle |
| Drawing |
|   IWin16DeviceContextFont: |
|     IWin16DeviceContext |
|     EnumFontFamiliesA |
|     EnumFontsW |
|     GetCharWidthA |
|     GetTextExtentPointA |
|     GetTextExtentPointW |
|   IWin16MetaFile : IWin16DeviceContext |
|     CloseMetaFile |
|     CopyMetaFileA |
|     DeleteMetaFile |
|     EnumMetaFile |
|     GetMetaFileA |
|     GetMetaFileBitsEx |
|     GetWinMetaFileBits |
|     PlayMetaFile |
|     PlayMetaFileRecord |
|   IWin16MetaFileFactory |
|     GetEnhMetaFileA |
|     SetEnhMetaFileBits |
|     SetMetaFileBitsEx |
|   IWin32Bitmap:IWin32GDIObject |
|     CreatePatternBrush |
|     GetBitmapDimensionEx |
|     GetDIBits |
|     SetBitmapDimensionEx |
|     SetDIBits |
|     SetDIBitsToDevice |
|   IWin32BitmapFactory |
|     CreateBitmap |
|     CreateBitmapIndirect |
|     CreateCompatibleBitmap |
|     CreateDIBSection |
|     CreateDIBitmap |
|     CreateDiscardableBitmap |
|   IWin32BrushFactory |
|     CreateBrushIndirect |
|     CreateDIBPatternBrushPt |
|     CreateHatchBrush |
|     CreateSolidBrush |
|   IWin32Colorspace |
|     DeleteColorSpace |
|   IWin32ColorspaceFactory |
|     CreateColorSpaceA |
|   IWin32Cursor |
|     DestroyCursor |
|     SetCursor |
|   IWin32CursorFactory |
|     GetCursor |
|   IWin32CursorUtility |
|     ClipCursor |
|     GetCursorPos |
|     SetCursorPos |
|     ShowCursor |
|   IWin32DeviceContext ← |
|     IWin32DeviceContextFont, |
|     IWin32DeviceContextCoords, |
|     IWin32Path, |
|     IWin32DeviceContextProperties, |
|     IWin32ScreenClip |
|     AngleArc |
|     Arc |
|     ArcTo |
|     BitBlt |
|     Chord |
|     CreateCompatibleDC |
|     DeleteDC |
|     DrawEdge |
|     DrawEscape |
|     DrawFocusRect |
|     DrawFrameControl |
|     DrawIcon |
|     DrawIconEx |
|     DrawStateA |
|     DrawTextA |
|     DrawTextW |
|     Ellipse |
|     EnumObjects |
|     ExtFloodFill |
|     ExtTextOutA |
|     ExtTextOutW |
|     FillRect |
|     FillRgn |
|     FloodFill |
|     FrameRect |
|     FrameRgn |
|     GdiFlush |
|     GetCurrentObject |
|     GetCurrentPositionEx |
|     GetPixel |
|     GrayStringA |
|     GrayStringW |
|     InvertRect |
|     InvertRgn |
|     LineDDA |
|     LineTo |
|     MaskBlt |
|     MoveToEx |
|     PaintRgn |
|     PatBlt |
|     Pie |
|     PlgBlt |
|     PolyBezier |
|     PolyBezierTo |
|     PolyDraw |
|     PolyPolygon |
|     PolyPolyline |
|     Polygon |
|     Polyline |
|     PolylineTo |
|     Rectangle |
|     ReleaseDC |
|     ResetDCA |
|     RestoreDC |
|     RoundRect |
|     SaveDC |
|     ScrollDC |
|     SetPixel |
|     SetPixelV |
|     StretchBlt |
|     StretchDIBits |
|     TabbedTextOutA |
|     TextOutA |
|     TextOutW |
|     WindowFromDC |
|   IWin32DeviceContextCoordinates |
|     DPtoLP |
|     LPtoDP |
|   IWin32DeviceContextFactory |
|     CreateDCA |
|     CreateDCW |
|     CreateICA |
|     CreateICW |
|     CreateMetaFileA |
|     CreateMetaFileW |
|   IWin32DeviceContextFont |
|     EnumFontFamiliesExA |
|     GetAspectRatioFilterEx |
|     GetCharABCWidthsA |
|     GetCharABCWidthsFloatA |
|     GetCharABCWidthsW |

-continued

Factorization List

GetCharWidth32A
GetCharWidth32W
GetCharWidthFloatA
GetFontData
GetGlyphOutlineA
GetGlyphOutlineW
GetKerningPairsA
GetOutlineTextMetricsA
GetTabbedTextExtentA
GetTextAlign
GetTextCharacterExtra
GetTextCharsetInfo
GetTextColor
GetTextExtentExPointA
GetTextExtentExPointW
GetTextExtentPoint32A
GetTextExtentPoint32W
GetTextFaceA
GetTextMetricsA
GetTextMetricsW
SetMapperFlags
SetTextAlign
SetTextCharacterExtra
SetTextColor
SetTextJustification
IWin32DeviceContextProperties
  GetArcDirection
  GetBkColor
  GetBkMode
  GetBoundsRect
  GetBrushOrgEx
  GetColorAdjustment
  GetColorSpace
  GetDeviceCaps
  GetMapMode
  GetNearestColor
  GetPolyFillMode
  GetROP2
  GetStretchBltMode
  GetViewportExtEx
  GetViewportOrgEx
  GetWindowExtEx
  GetWindowOrgEx
  OffsetViewportOrgEx
  OffsetWindowOrgEx
  PtVisible
  RectVisible
  ScaleViewportExtEx
  ScaleWindowExtEx
  SetArcDirection
  SetBkColor
  SetBkMode
  SetBoundsRect
  SetBrushOrgEx
  SetColorAdjustment
  SetColorSpace
  SetDIBColorTable
  SetICMMode
  SetMapMode
  SetMiterLimit
  SetPolyFillMode
  SetROP2
  SetStretchBltMode
  SetViewportExtEx
  SetViewportOrgEx
  SetWindowExtEx
  SetWindowOrgEx
  UpdateColors
IWin32EnhMetaFile: IWin32DeviceContext
  CloseEnhMetaFile
  CopyEnhMetaFileA
  CreateEnhMetaFileA
  CreateEnhMetaFileW
  DeleteEnhMetaFile
  EnumEnhMetaFile
  GdiComment -continued Factorization List GetEnhMetaFileBits
  GetEnhMetaFileDescriptionA
  GetEnhMetaFileDescriptionW
  GetEnhMetaFileHeader
  GetEnhMetaFilePaletteEntries
  PlayEnhMetaFile
  PlayEnhMetaFileRecord
IWin32EnhMetaFileFactory
  SetWinMetaFileBits
IWin32FontFactory
  CreateFontA
  CreateFontIndirectA
  CreateFontIndirectW
  CreateFontW
IWin32GDIObject
  DeleteObject
  GetObjectA
  GetObjectType
  GetObjectW
  SelectObject
  UnrealizeObject
IWin32GDIObjectFactory
  GetStockObject
IWin32Icon
  CopyIcon
  DestroyIcon
  GetIconInfo
IWin32IconFactory
  CreateIcon
  CreateIconFromResource
  CreateIconFromResourceEx
  CreateIconIndirect
  CreateMenu
IWin32Palette : IWin32GDIObject
  AnimatePalette
  GetNearestPaletteIndex
  GetPaletteEntries
  ResizePalette
  SelectPalette
  SetPaletteEntries
IWin32PaletteFactory
  CreateHalftonePalette
  CreatePalette
IWin32PaletteSystem
  GetSystemPaletteEntries
  GetSystemPaletteUse
  RealizePalette
IWin32Path
  AbortPath
  BeginPath
  CloseFigure
  EndPath
  FillPath
  FlattenPath
  GetMiterLimit
  GetPath
  PathToRegion
  StrokeAndFillPath
  StrokePath
  WidenPath
IWin32PenFactory
  CreatePen
  CreatePenIndirect
  ExtCreatePen
IWin32Print : IWin32DeviceContext
  AbortDoc
  EndDoc
  EndPage
  Escape
  ExtEscape
  SetAbortProc
  StartDocA
  StartDocW
  StartPage
IWin32Rect
  CopyRect
  EqualRect

| Factorization List |
|---|
| InflateRect |
| IntersectRect |
| IsRectEmpty |
| OffsetRect |
| PtInRect |
| SetRect |
| SetRectEmpty |
| SubtractRect |
| UnionRect |
| IWin32Region : IWin32GDIObject |
|   CombineRgn |
|   EqualRgn |
|   GetRegionData |
|   GetRgnBox |
|   OffsetRgn |
|   PtInRegion |
|   RectInRegion |
|   SetRectRgn |
| IWin32RegionFactory |
|   CreateEllipticRgn |
|   CreateEllipticRgnIndirect |
|   CreatePolyPolygonRgn |
|   CreatePolygonRgn |
|   CreateRectRgn |
|   CreateRectRgnIndirect |
|   CreateRoundRectRgn |
|   ExtCreateRegion |
| IWin32ScreenClip : IWin32DeviceContext |
|   ExcludeClipRect |
|   ExcludeUpdateRgn |
|   ExtSelectClipRgn |
|   GetClipBox |
|   GetClipRgn |
|   IntersectClipRect |
|   OffsetClipRgn |
|   SelectClipPath |
|   SelectClipRgn |
| Environment |
|   IWin32EnvironmentUtility |
|     FreeEnvironmentStringsA |
|     FreeEnvironmentStringsW |
|     GetEnvironmentStrings |
|     GetEnvironmentStringsW |
|     GetEnvironmentVariableW |
|     SetEnvironmentVariableA |
|     SetEnvironmentVariableW |
| File |
|   IWin16File : IWin16Handle |
|     _hread |
|     _hwrite |
|     _lclose |
|     _llseek |
|     _lopen |
|     _lwrite |
|   IWin16FileFactory |
|     OpenFile |
|     _lcreat |
|     _lread |
|   IWin32File : IWin32AsyncIOHandle |
|     FlushFileBuffers |
|     GetFileInformationByHandle |
|     GetFileSize |
|     GetFileTime |
|     GetFileType |
|     LockFile |
|     LockFileEx |
|     ReadFile |
|     ReadFileEx |
|     SetEndOfFile |
|     SetFilePointer |
|     SetFileTime |
|     UnlockFile |
|     WriteFile |
|     WriteFileEx |
|   IWin32FileFactory |
|     CreateFileA |
|     CreateFileW |
|     OpenFileMappingA |
|   IWin32FileMapping: IWin32ASyncIOHandle |
|     MapViewOfFile |
|     UnmapViewOfFile |
|   IWin32FileMappingFactory |
|     CreateFileMappingA |
|   IWin32FileSystem |
|     CopyFileA |
|     CopyFileEx |
|     CopyFileW |
|     CreateDirectoryA |
|     CreateDirectoryExA |
|     CreateDirectoryExW |
|     CreateDirectoryW |
|     DeleteFileA |
|     DeleteFileW |
|     GetDiskFreeSpaceA |
|     GetDiskFreeSpaceEx |
|     GetDriveTypeA |
|     GetDriveTypeW |
|     GetFileAttributesA |
|     GetFileAttributesW |
|     GetFileVersionInfoA |
|     GetFileVersionInfoSizeA |
|     GetLogicalDriveStringsA |
|     GetLogicalDrives |
|     GetVolumeInformationA |
|     GetVolumeInformationW |
|     MoveFileA |
|     MoveFileEx |
|     MoveFileW |
|     RemoveDirectoryA |
|     RemoveDirectoryW |
|     SetFileAttributesA |
|     SetFileAttributesW |
|     UnlockFileEx |
|     VerQueryValueA |
|   IWin32FileUtility |
|     AreFileApisANSI |
|     CompareFileTime |
|     DosDateTimeToFileTime |
|     FileTimeToDosDateTime |
|     FileTimeToLocalFileTime |
|     FileTimeToSystemTime |
|     GetFullPathNameA |
|     GetFullPathNameW |
|     GetShortPathNameA |
|     GetShortPathNameW |
|     GetTempFileNameA |
|     GetTempFileNameW |
|     GetTempPathA |
|     GetTempPathW |
|     LocalFileTimetoFileTime |
|     SearchPathA |
|     SystemTimeToFileTime |
|   IWin32FindFile : IWin32ASyncIOHandle |
|     FindClose |
|     FindCloseChangeNotification |
|     FindFirstFileEx |
|     FindNextChangeNotification |
|     FindNextFileA |
|     FindNextFileW |
|   IWin32FindFileFactory |
|     FindFirstChangeNotificationA |
|     FindFirstChangeNotificationW |
|     FindFirstFileA |
|     FindFirstFileW |
| Interprocess Communication |
|   IWin32DDE |
|     DdeAccessData |
|     DdeDisconnect |
|     DdeFreeDataHandle |
|     DdeFreeStringHandle |
|     DdeUnaccessData |
|   IWin32DDEFactory |

| Factorization List |
|---|
| DdeClientTransaction |
| DdeConnect |
| DdeCreateStringHandleA |
| IWin32DDEUtility |
| DdeGetLastError |
| DdeInitializeA |
| ReuseDDElParam |
| UnpackDDElParam |
| IWin32Pipe : IWin32AsyncIOHandle |
| PeekNamedPipe |
| IWin32PipeFactory |
| CreatePipe |
| Keyboard |
| IWin32Keyboard |
| GetAsyncKeyState |
| GetKeyState |
| GetKeyboardState |
| MapVirtualKeyA |
| SetKeyboardState |
| VkKeyScanA |
| keybd_event |
| IWin32KeyboardLayout |
| ActivateKeyboardLayout |
| IWin32KeyboardLayoutFactory |
| GetKeyboardLayout |
| Memory |
| IWin16GlobalMemory : IWin16Memory |
| GlobalFlags |
| GlobalFree |
| GlobalLock |
| GlobalReAlloc |
| GlobalSize |
| GlobalUnlock |
| IWin16GlobalMemoryFactory |
| GlobalAlloc |
| GlobalHandle |
| IWin32Heap : IWin32Memory |
| HeapAlloc |
| HeapCompact |
| HeapDestroy |
| HeapFree |
| HeapReAlloc |
| HeapSize |
| HeapValidate |
| HeapWalk |
| IWin32HeapFactory |
| GetProcessHeap |
| HeapCreate |
| IWin16LocalMemory : IWin16Memory |
| LocalFree |
| LocalLock |
| LocalReAlloc |
| LocalUnlock |
| IWin32LocalMemoryFactory |
| LocalAlloc |
| IWin16Memory |
| IsBadCodePtr |
| IsBadReadPtr |
| IsBadStringPtrA |
| IsBadStringPtrW |
| IsBadWritePtr |
| IWin32Memory |
| IsBadCodePtr |
| IsBadReadPtr |
| IsBadStringPtrA |
| IsBadStringPtrW |
| IsBadWritePtr |
| IWin32VirtualMemory : IWin32Memory |
| VirtualFree |
| VirtualLock |
| VirtualProtect |
| VirtualQuery |
| VirtualUnlock |
| IWin32VirtualMemoryFactory |
| VirtualAlloc |
| Module |
| IWin32Module : IWin32Handle |

| Factorization List |
|---|
| DisableThreadLibraryCalls |
| EnumResourceNamesA |
| FindResourceA |
| FreeLibrary |
| GetModuleFileNameA |
| GetModuleFileNameW |
| GetProcAddress |
| LoadBitmapA |
| LoadBitmapW |
| LoadCursorA |
| LoadCursorW |
| LoadIconA |
| LoadIconW |
| LoadImageA |
| LoadMenuA |
| LoadMenuIndirectA |
| LoadStringA |
| SizeofResource |
| IWin32ModuleFactory |
| GetModuleHandleA |
| GetModuleHandleW |
| LoadLibraryA |
| LoadLibraryExA |
| LoadLibraryW |
| Multiple Window Position |
| IWin32MWP |
| BeginDeferWindowPos |
| DeferWindowPos |
| EndDeferWindowPos |
| Ole |
| IWin32Ole |
| CoDisconnectObject |
| CoLockObjectExternal |
| CoRegisterClassObject |
| CoRevokeClassObject |
| IWin32OleFactory |
| BindMoniker |
| CoCreateInstance |
| CoGetClassObject |
| CoGetInstanceFromFile |
| CreateDataAdviseHolder |
| CreateDataCache |
| CreateILockBytesOnHGlobal |
| CreateOleAdviseHolder |
| CreateStreamOnHGlobal |
| OleCreate |
| OleCreateDefaultHandler |
| OleCreateFromData |
| OleCreateFromFile |
| OleCreateLink |
| OleCreateLinkFromData |
| OleCreateLinkToFile |
| OleGetClipboard |
| OleLoad |
| IWin32OleMarshalUtility |
| CoMarshalInterface |
| CoReleaseMarshalData |
| CoUnmarshalInterface |
| IWin32OleMoniker |
| CreateGenericComposite |
| CreateItemMoniker |
| CreatePointerMoniker |
| CreateURLMoniker |
| MkParseDisplayName |
| MonikerCommonPrefixWith |
| MonikerRelativePathTo |
| IWin32OleMonikerFactory |
| CreateBindCtx |
| CreateFileMoniker |
| GetRunningObjectTable |
| IWin32OleStg |
| OleConvertIStorageToOLESTREAM |
| OleSave |
| ReadClassStg |
| ReleaseStgMedium |
| WriteClassStg |
| WriteFmtUserTypeStg |

Factorization List

IWin32OleStgFactory
  StgCreateDocfile
  StgCreateDocfileOnILockBytes
  StgIsStorageFile
  StgOpenStorage
IWin32OleStream
  GetHGlobalFromStream
  OleConvertOLESTREAMToIStorage
  OleLoadFromStream
  OleSaveToStream
  ReadClassStm
  WriteClassStm
IWin32OleUtility
  CLSIDFromProgID
  CLSIDFromString
  CoCreateGuid
  CoFileTimeNow
  CoFreeUnusedLibraries
  CoGetMalloc
  CoInitialize
  CoRegisterMessageFilter
  CoTaskMemAlloc
  CoTaskMemFree
  CoTaskMemRealloc
  CoUninitialize
  GetClassFile
  GetHGlobalFromILockBytes
  IIDFromString
  OleGetIconOfClass
  OleInitialize
  OleIsRunning
  OleRegEnumVerbs
  OleRegGetMiscStatus
  OleRegGetUserType
  OleSetClipboard
  OleUninitialize
  ProgIDFromCLSID
  PropVariantClear
  RegisterDragDrop
  RevokeDragDrop
  StringFromCLSID
  StringFromGUID2
  StringFromIID
OpenGL
  IWin32GL
    glBegin
    glClear
    glClearColor
    glClearDepth
    glColor3d
    glEnable
    glEnd
    glFinish
    glMatrixMode
    glNormal3d
    glPolygonMode
    glPopMatrix
    glPushMatrix
    glRotated
    glScaled
    glTranslated
    glVertex3d
    glViewport
    wglCreateContext
    wglGetCurrentDC
    wglMakeCurrent
  IWin32GLU
    gluCylinder
    gluDeleteQuadric
    gluNewQuadric
    gluPerspective
    gluQuadricDrawStyle
    gluQuadricNormals
Printer
  IWin32Printer
    ClosePrinter
    DocumentPropertiesA
    GetPrinterA
  IWin32PrinterFactory
    OpenPrinterA
    OpenPrinterW
  IWin32PrinterUtility
    DeviceCapabilitiesA
    EnumPrintersA
Process
  IWin16ProcessFactory
    WinExec
  IWin32Process : IWin32SyncHandle ←
    IWin32ProcessContext
    DebugBreak
    ExitProcess
    FatalAppExitA
    FatalExit
    GetExitCodeProcess
    GetCurrentProcessId
    GetProcessVersion
    GetProcessWorkingSetSize
    OpenProcessToken
    SetProcessWorkingSetSize
    TerminateProcess
    UnhandledExceptionFilter
  IWin32ProcessContext
    GetCommandLineA
    GetCommandLineW
    GetCurrentDirectoryA
    GetCurrentDirectoryW
    GetStartupInfoA
    SetConsoleCtrlHandler
    SetCurrentDirectoryA
    SetCurrentDirectoryW
    SetHandleCount
    SetUnhandledExceptionFilter
  IWin32ProcessFactory
    CreateProcessA
    CreateProcessW
    OpenProcess
Registry
  IWin16Profile
    GetPrivateProfileIntA
    GetPrivateProfileStringA
    GetPrivateProfileStringW
    GetProfileIntA
    GetProfileIntW
    GetProfileStringA
    GetProfileStringW
    WritePrivateProfileStringA
    WritePrivateProfileStringW
    WriteProfileStringA
    WriteProfileStringW
  IWin16Registry
    RegCreateKeyExA
    RegCreateKeyW
    RegEnumKeyA
    RegEnumKeyW
    RegOpenKeyA
    RegOpenKeyW
    RegQueryValueA
    RegQueryValueW
    RegSetValueA
    RegSetValueW
  IWin32Registry
    RegCloseKey
    RegCreateKeyA
    RegCreateKeyExW
    RegDeleteKeyA
    RegDeleteKeyW
    RegDeleteValueA
    RegDeleteValueW
    RegEnumKeyExA
    RegEnumKeyExW
    RegEnumValueA
    RegEnumValueW
    RegFlushKey
    RegNotifyChangeKeyValue

| Factorization List |
|---|
| RegOpenKeyExA |
| RegOpenKeyExW |
| RegQueryInfoKeyA |
| RegQueryInfoKeyW |
| RegQueryValueExA |
| RegQueryValueExW |
| RegSetValueExA |
| RegSetValueExW |
| Resource |
|   IWin32Resource |
|     LoadResource |
|     LockResource |
| Security |
|   IWin32SecurityACL |
|     AddAccessAllowedAce |
|     AddAccessDeniedAce |
|     AddAce |
|     DeleteAce |
|     GetAce |
|     GetAclInformation |
|   IWin32SecurityACLUtility |
|     InitializeAcl |
|     IsValidAcl |
|   IWin32SecurityAccess |
|     CopySid |
|     EqualSid |
|     GetLengthSid |
|     IsValidSid |
|     LookupAccountNameA |
|     LookupAccountSid |
|     LookupPrivilegeValueA |
|   IWin32SecurityDescriptor |
|     GetSecurityDescriptorDacl |
|     GetSecurityDescriptorGroup |
|     GetSecurityDescriptorOwner |
|     GetSecurityDescriptorSacl |
|     IsValidSecurityDescriptor |
|     SetSecurityDescriptorDacl |
|     SetSecurityDescriptorGroup |
|     SetSecurityDescriptorOwner |
|     SetSecurityDescriptorSacl |
|   IWin32SecurityDescriptorFactory |
|     InitializeSecurityDescriptor |
|   IWin32SecurityToken : IWin32Handle |
|     AdjustTokenPrivileges |
|     GetTokenInformation |
|   IWin32SecurityToken : IWin32Handle |
|     OpenProcessToken |
|     OpenThreadToken |
| Shell |
|   IWin32Drop |
|     DragFinish |
|     DragQueryFileW |
|     DragQueryPoint |
|   IWin32Shell |
|     SHGetDesktopFolder |
|     SHGetFileInfoA |
|     ShellExecuteA |
| Synchronization |
|   IWin32AtomicUtility |
|     InterlockedDecrement |
|     InterlockedExchange |
|     InterlockedIncrement |
|   IWin32CriticalSection |
|     DeleteCriticalSection |
|     EnterCriticalSection |
|     LeaveCriticalSection |
|   IWin32CriticalSectionFactory |
|     InitializeCriticalSection |
|   IWin32Event : IWin32SyncHandle |
|     PulseEvent |
|     ResetEvent |
|     SetEvent |
|   IWin32EventFactory |
|     CreateEventA |
|   IWin32Mutex : IWin32SyncHandle |
|     ReleaseMutex |
|   IWin32MutexFactory |
|     CreateMutexA |
|     OpenMutexA |
|   IWin32Semaphore : IWin32SyncHandle |
|     ReleaseSemaphore |
|   IWin32SemaphoreFactory |
|     CreateSemaphoreA |
|   IWin32SyncHandle : IWin32Handle |
|     MsgWaitForMultipleObjects |
|     SignalObjectAndWait |
|     WaitForMultipleObjects |
|     WaitForSingleObject |
|     WaitForSingleObjectEx |
|   IWin32WaitableTimer : |
|     IWin32SyncHandle |
|     CancelWaitableTimer |
|     SetWaitableTimer |
|   IWin32WaitableTimerFactory |
|     CreateWaitableTimer |
|     OpenWaitableTimer |
| System |
|   IWin32WindowsHook |
|     CallNextHookEx |
|     UnhookWindowsHookEx |
|   IWin32WindowsHookFactory |
|     SetWindowsHookExA |
|     SetWindowsHookExW |
|   IWin32WindowsHookUtility |
|     CallMsgFilterA |
|     CallMsgFilterW |
| Thread |
|   IWin32Thread : IWin32SyncHandle ← |
|     IWin32ThreadContext, |
|     IWin32ThreadMessage |
|     DispatchMessageA |
|     DispatchMessageW |
|     ExitThread |
|     GetCurrentThreadId |
|     GetExitCodeThread |
|     GetThreadLocale |
|     GetThreadPriority |
|     OpenThreadToken |
|     ResumeThread |
|     SetThreadPriority |
|     SetThreadToken |
|     Sleep |
|     SuspendThread |
|     TerminateThread |
|     TlsAlloc |
|     TlsFree |
|     TlsGetValue |
|     TlsSetValue |
|   IWin32ThreadContext |
|     EnumThreadWindows |
|     GetActiveWindow |
|   IWin32ThreadFactory |
|     CreateThread |
|   IWin32ThreadMessage |
|     GetMessageA |
|     GetMessagePos |
|     GetMessageTime |
|     GetMessageW |
|     GetQueueStatus |
|     PostQuitMessage |
|     PostThreadMessageA |
|     TranslateMessage |
|     WaitMessage |
|   IWin32ThreadUtility |
| Timer |
|   IWin32Timer |
|     KillTimer |
|     SetTimer |
| Utilities |
|   IWin32Beep |
|     Beep |
|     MessageBeep |
|   IWin32StringUtility |

-continued

| Factorization List |
|---|
| CharLowerA |
| CharLowerBuffA |
| CharLowerW |
| CharNextA |
| CharNextW |
| CharPrevA |
| CharToOemA |
| CharUpperA |
| CharUpperBuffA |
| CharUpperBuffW |
| CharUpperW |
| CompareStringA |
| CompareStringW |
| FormatMessageA |
| FormatMessageW |
| GetStringTypeA |
| GetStringTypeExA |
| GetStringTypeW |
| IsCharAlphaA |
| IsCharAlphaNumericA |
| IsCharAlphaNumericW |
| IsCharAlphaW |
| IsDBCSLeadByte |
| IsDBCSLeadByteEx |
| LCMapStringA |
| LCMapStringW |
| MultiByteToWideChar |
| OutputDebugStringA |
| OutputDebugStringW |
| ToAscii |
| WideCharToMultiByte |
| lstrcatA |
| lstrcmpA |
| lstrcmpiA |
| lstrcpyA |
| lstrcpyW |
| lstrcpynA |
| lstrlenA |
| lstrlenW |
| wsprintfA |
| wsprintfW |
| wvsprintfA |
| IWin32SystemUtility |
| CountClipboardFormats |
| EmptyClipboard |
| EnumClipboardFormats |
| EnumSystemLocalesA |
| GetACP |
| GetCPInfo |
| GetComputerNameW |
| GetCurrentProcess |
| GetCurrentProcessId |
| GetCurrentThread |
| GetCurrentThreadId |
| GetDateFormatA |
| GetDateFormatW |
| GetDialogBaseUnits |
| GetDoubleClickTime |
| GetLastError |
| GetLocalTime |
| GetLocaleInfoA |
| GetLocaleInfoW |
| GetOEMCP |
| GetSysColor |
| GetSysColorBrush |
| GetSystemDefaultLCID |
| GetSystemDefaultLangID |
| GetSystemDirectoryA |
| GetSystemInfo |
| GetSystemMetrics |
| GetSystemTime |
| GetTickCount |
| GetTimeFormatA |
| GetTimeFormatW |
| GetTimeZoneInformation |
| GetUserDefaultLCID |
| GetUserDefaultLangID |

-continued

| Factorization List |
|---|
| GetUserNameA |
| GetUserNameW |
| GetVersion |
| GetVersionExA |
| GetWindowsDirectoryA |
| GetWindowsDirectoryW |
| GlobalMemoryStatus |
| IsValidCodePage |
| IsValidLocale |
| OemToCharA |
| QueryPerformanceCounter |
| QueryPerformanceFrequency |
| RaiseException |
| RegisterWindowMessageA |
| SetErrorMode |
| SetLastError |
| SetLocalTime |
| SystemParametersInfoA |
| IWin32Utility |
| MulDiv |
| Window |
|   IWin32Accel |
|     CopyAcceleratorTableA |
|     TranslateAcceleratorA |
|   IWin32AccelFactory |
|     LoadAcceleratorsA |
|   IWin32Dialog : IWin32Window ← |
|     IWin32DialogState |
|     ChooseColorA |
|     DialogBoxParamA |
|     DialogBoxParamW |
|     EndDialog |
|     MapDialogRect |
|     SendDlgItemMessageA |
|   IWin32DialogFactory |
|     CreateDialogIndirectParamA |
|     CreateDialogParamA |
|     DialogBoxIndirectParamA |
|   IWin32DialogState |
|     CheckDlgButton |
|     GetDlgCtrlID |
|     GetDlgItem |
|     GetDlgItemInt |
|     GetDlgItemTextA |
|     GetNextDlgGroupItem |
|     GetNextDlgTabItem |
|     IsDlgButtonChecked |
|     SetDlgItemInt |
|     SetDlgItemTextA |
|   IWin32Menu ←IWin32MenuState |
|     DeleteMenu |
|     DestroyMenu |
|     InsertMenuA |
|     InsertMenuW |
|     IsMenu |
|     ModifyMenuA |
|     RemoveMenu |
|     TrackPopupMenu |
|   IWin32MenuFactory |
|     CreatePopupMenu |
|   IWin32MenuState |
|     AppendMenuA |
|     AppendMenuW |
|     ArrangeIconicWindows |
|     BringWindowToTop |
|     CheckMenuItem |
|     CheckMenuRadioItem |
|     CheckRadioButton |
|     EnableMenuItem |
|     GetMenuItemCount |
|     GetMenuItemID |
|     GetMenuItemRect |
|     GetMenuState |
|     GetMenuStringA |
|     GetSubMenu |
|     HiliteMenuItem |
|     SetMenuDefaultItem |

| Factorization List |
|---|
| SetMenuItemBitmaps |
| IWin32Window ← |
|     IWin32WindowProperties, |
|     IWin32WindowState |
|   BeginPaint |
|   CallWindowProcA |
|   CallWindowProcW |
|   ChildWindowFromPoint |
|   ChildWindowFromPointEx |
|   ClientToScreen |
|   CloseWindow |
|   CreateCaret |
|   DefFrameProcA |
|   DefMDIChildProcA |
|   DefWindowProcA |
|   DefWindowProcW |
|   DestroyWindow |
|   DlgDirListA |
|   DlgDirListComboBoxA |
|   DlgDirSelectComboBoxExA |
|   DlgDirSelectExA |
|   DrawAnimatedRects |
|   DrawMenuBar |
|   EndPaint |
|   EnumChildWindows |
|   EnumWindows |
|   FindWindow |
|   FlashWindow |
|   MapWindowPoints |
|   MessageBoxA |
|   MessageBoxW |
|   MoveWindow |
|   OpenClipboard |
|   OpenIcon |
|   PeekMessageA |
|   PeekMessageW |
|   PostMessageA |
|   PostMessageW |
|   RedrawWindow |
|   ScreenToClient |
|   ScrollWindow |
|   ScrollWindowEx |
|   SendMessageA |
|   SendMessageW |
|   SendNotifyMessageA |
|   TranslateMDISysAccel |
|   UpdateWindow |
| IWin32WindowFactory |
|   CreateWindowExA |
|   CreateWindowExW |
| IWin32WindowProperties |
|   DragAcceptFiles |
|   GetClassLongA |
|   GetClassNameA |
|   GetClassNameW |
|   GetPropA |
|   GetPropW |
|   RemovePropA |
|   RemovePropW |
|   SetClassLongA |
|   SetPropA |
|   SetPropW |
| IWin32WindowState |
|   EnableScrollBar |
|   EnableWindow |
|   GetClientRect |
|   GetDC |
|   GetDCEx |
|   GetLastActivePopup |
|   GetMenu |
|   GetParent |
|   GetScrollInfo |
|   GetScrollPos |
|   GetScrollRange |
|   GetSystemMenu |
|   GetTopWindow |
|   GetUpdateRect |
|   GetUpdateRgn |
|   GetWindow |
|   GetWindowDC |
|   GetWindowLongA |
|   GetWindowLongW |
|   GetWindowPlacement |
|   GetWindowRect |
|   GetWindowRgn |
|   GetWindowTextA |
|   GetWindowTextLengthA |
|   GetWindowTextW |
|   GetWindowThreadProcessId |
|   HideCaret |
|   InvalidateRect |
|   InvalidateRgn |
|   IsWindowEnabled |
|   IsChild |
|   IsIconic |
|   IsWindow |
|   IsWindowUnicode |
|   IsWindowVisible |
|   IsZoomed |
|   LockWindowUpdate |
|   SetActiveWindow |
|   SetClipboardViewer |
|   SetFocus |
|   SetForegroundWindow |
|   SetMenu |
|   SetParent |
|   SetScrollInfo |
|   SetScrollPos |
|   SetScrollRange |
|   SetWindowLongA |
|   SetWindowLongW |
|   SetWindowPlacement |
|   SetWindowPos |
|   SetWindowRgn |
|   SetWindowTextA |
|   SetWindowTextW |
|   ShowCaret |
|   ShowOwnedPopups |
|   ShowScrollBar |
|   ShowWindow |
|   ValidateRect |
|   ValidateRgn |
| IWin32WindowUtility |
|   AdjustWindowRect |
|   AdjustWindowRectEx |
|   EnumWindows |
|   FindWindowA |
|   GetActiveWindow |
|   GetCapture |
|   GetCaretPos |
|   GetClassInfoA |
|   GetClassInfoExA |
|   GetClassInfoW |
|   GetDesktopWindow |
|   GetFocus |
|   GetForegroundWindow |
|   InSendMessage |
|   IsDialogMessageA |
|   RegisterClassA |
|   RegisterClassExA |
|   RegisterClass |

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer readable storage media comprising computer executable instructions that, when executed on a computer, direct the computer to:
   define criteria that governs how functions of an operating system are to be factored into one or more groups;
   factor the functions into one or more groups based upon the criteria; and
   associate the one or more groups with programming objects that have data and methods, wherein the methods correspond to the operating system functions effective to provide an object oriented operating system, the programming objects being configured to be instantiated throughout a remote computing system wherein the programming objects comprise Common Object Model (COM) objects.

2. One or more computer readable storage media of claim 1, wherein the programming objects have interfaces through which the methods can be accessed.

3. One or more computer readable storage media of claim 1 further comprising instantiating a plurality of programming objects across a process boundary.

4. One or more computer readable storage media of claim 1, further comprising instantiating a plurality of programming objects across a machine boundary.

5. One or more computer readable storage media of claim 1, wherein the criteria is based, at least in part, on the manner in which particular functions behave.

6. One or more computer readable storage media of claim 5, wherein the manner includes a consideration of the types of operating system resources that are associated with the operation of a function.

7. One or more computer readable storage media of claim 5, wherein the manner includes a consideration of whether a particular function creates an operating system resource.

8. One or more computer readable storage media of claim 5, wherein the manner includes a consideration of whether a particular function operates upon an operating system resource.

9. One or more computer readable storage media of claim 1, wherein the criteria is based, at least in part, on the manner in which particular functions behave, wherein the manner includes:
   a consideration of the types of operating system resources that are associated with the operation of a function; and
   a consideration of whether a particular function creates an operating system resource.

10. One or more computer readable storage media of claim 1, wherein the criteria is based, at least in part, on the manner in which particular functions behave, wherein the manner includes:
    a consideration of the types of operating system resources that are associated with the operation of a function call; and
    a consideration of whether a particular function operates upon a given operating system resource.

11. One or more computer readable storage media comprising computer executable instructions that, when executed on a computer, direct the computer to:
    factoring a plurality of operating system functions into interface groups based upon the resources with which a function is associated;
    factoring the interface groups into interface sub-groups based upon each function's use of a handle that represents a resource; and
    wherein said factoring comprises creating a hierarchy of object interfaces in which certain interfaces can inherit from other interfaces, individual interface sub-groups being associated with individual programming objects that can be instantiated across at least one process boundary of a remote computing system and where the programming objects include COM objects.

12. One or more computer readable storage media of claim 11, wherein said organizing comprises aggregating at least one of the interface sub-groups.

13. One or more computer readable storage media of claim 11, wherein the factoring of the interface groups into interface sub-groups comprises considering whether a function creates a handle.

14. One or more computer readable storage media of claim 11, wherein said organizing comprises aggregating at least one of the interface sub-groups, and wherein the factoring of the interface groups into interface sub-groups comprises considering whether a function call creates a handle.

15. One or more computer readable storage media comprising an operating system having:
    a plurality of programming objects having interfaces, wherein the programming objects represent operating system resources, and wherein the interfaces define methods that are organized in accordance with whether they create an operating system resource or not;
    wherein the programming objects are configured to be called either directly or indirectly by an application; and
    wherein the methods are configured to call operating system functions responsive to being called directly or indirectly by an application;
    said programming objects being configured to be instantiated throughout a remote computing system such that at least some of the programming objects are disposed across at least one machine boundary of a remote computing system and wherein the programming objects include Common Object Model (COM) objects.

16. One or more computer readable storage media of claim 15, wherein some of the objects are disposed across at least one process boundary.

17. One or more computer readable storage media comprising computer executable instructions that, when executed on a computer, direct the computer to convert an operating system from a non-object-oriented format to an object oriented format, wherein the operating system includes a plurality of operating system functions that are callable to create or use operating system resources, the converting performed by:
    defining a plurality of programming object interfaces that define methods that correspond to the operating system functions, wherein programming objects that support the interfaces are callable either directly by an application that makes object-oriented calls, or indirectly by an application that makes function calls;
    calling a programming object interface either directly via an object-oriented call, or indirectly via an indirection that transforms a function call into an object-oriented call; and
    responsive to said calling, calling an operating system function with a method of the programming object that supports said programming object interface wherein at least some of the programming objects are disposed across at least one process boundary of a remote computing system and wherein the programming objects include Common Object Model (COM) objects.

18. A computing device comprising:
    a processor; and
    memory configured to maintain one or more modules that are executable on the processor to:

factor a plurality of operating system functions into interface groups based upon the resources with which a function is associated;

factor the interface groups into interface sub-groups based upon each function's use of a handle that represents a resource; and wherein said factoring comprises creating a hierarchy of object interfaces in which certain interfaces can inherit from other interfaces, individual interface sub-groups being associated with individual programming objects that can be instantiated across at least one process boundary of a remote computing system and wherein the programming objects include Common Object Model (COM) objects.

19. A computing device of claim 18, wherein said organizing comprises aggregating at least one of the interface sub-groups.

20. A computing device of claim 18, wherein said factoring of the interface groups into interface sub-groups comprises considering whether a function creates a handle.

21. A computing device of claim 18, wherein said organizing comprises aggregating at least one of the interface sub-groups, and wherein the factoring of the interface groups into interface sub-groups comprises considering whether a function call creates a handle.

* * * * *